United States Patent
Burdsall et al.

(10) Patent No.: US 11,893,571 B2
(45) Date of Patent: *Feb. 6, 2024

(54) ELECTRONIC TRANSACTION PROCESSING SYSTEMS AND METHODS

(71) Applicant: WORLDPAY LIMITED, London (GB)

(72) Inventors: Ben Burdsall, London (GB); Jonathan Stewart Vokes, London (GB)

(73) Assignee: Worldpay Limited, London (GB)

( * ) Notice: Subject to any disclaimer, the term of this patent is extended or adjusted under 35 U.S.C. 154(b) by 212 days.

This patent is subject to a terminal disclaimer.

(21) Appl. No.: 17/448,371

(22) Filed: Sep. 22, 2021

(65) Prior Publication Data

US 2022/0005019 A1   Jan. 6, 2022

Related U.S. Application Data

(63) Continuation of application No. 16/609,154, filed as application No. PCT/GB2018/051113 on Apr. 27, 2018, now Pat. No. 11,182,772.

(30) Foreign Application Priority Data

Apr. 28, 2017 (GB) ..................... 1706773

(51) Int. Cl.
*G06Q 20/32* (2012.01)
*G06Q 20/34* (2012.01)
*G07G 1/00* (2006.01)

(52) U.S. Cl.
CPC ..... *G06Q 20/3278* (2013.01); *G06Q 20/3223* (2013.01); *G06Q 20/352* (2013.01); *G07G 1/0081* (2013.01)

(58) Field of Classification Search
CPC ........... G06Q 20/3278; G06Q 20/3223; G06Q 20/352; G07G 1/0081
See application file for complete search history.

(56) References Cited

U.S. PATENT DOCUMENTS 7,114,656 B1 * 10/2006 Garver .................. G06Q 20/20
235/462.46
9,697,509 B2 * 7/2017 Takasu ................. G06Q 20/201
(Continued)

FOREIGN PATENT DOCUMENTS

CN          104680677 A      6/2015
EP           2680243 A1      1/2014
(Continued)

OTHER PUBLICATIONS

Exam report in corresponding European Application No. 18723909.0 dated Feb. 15, 2021 (6 pages).
(Continued)

*Primary Examiner* — Christle I Marshall
(74) *Attorney, Agent, or Firm* — Bookoff McAndrews, PLLC

(57) ABSTRACT

The invention relates generally to the processing of electronic payments that involve an payment instrument. A payment instrument reading device is paired with a payment initiating device to allow transaction information generated by the payment initiating device to be automatically transmitted to its associated payment instrument reading device. This means that rekeying of transaction information is not required. In some embodiments one or more beacons are provided in a premises, to allow the location of a mobile payment initiating device to be determined. This location is used to either direct the payment initiating device to a payment instrument reading device, or vice versa. Transaction data generated by the payment initiating device is automatically transmitted to the payment instrument reading device. A pairing module is also provided, which is configured to pair a payment instrument reading device with a payment initiating device.

15 Claims, 11 Drawing Sheets

(56) References Cited

U.S. PATENT DOCUMENTS

| | | | |
|---|---|---|---|
| 9,754,249 B2* | 9/2017 | Takasu | G07G 1/0081 |
| 9,852,413 B2* | 12/2017 | Takasu | G06Q 20/208 |
| 9,940,612 B1* | 4/2018 | Hamilton | G06Q 20/4012 |
| 10,154,081 B2* | 12/2018 | Takasu | G06F 3/1203 |
| 10,686,881 B2* | 6/2020 | Aoki | H04L 67/1097 |
| 11,004,049 B2 | 5/2021 | Duellings et al. | |
| 11,182,772 B2* | 11/2021 | Burdsall | G06Q 20/3223 |
| 2004/0122738 A1* | 6/2004 | Lum | G07G 1/12 705/21 |
| 2004/0181454 A1 | 9/2004 | Manno | |
| 2007/0005685 A1 | 1/2007 | Chau et al. | |
| 2012/0062363 A1 | 3/2012 | George et al. | |
| 2012/0233006 A1 | 9/2012 | George et al. | |
| 2013/0346027 A1 | 12/2013 | George et al. | |
| 2014/0019274 A1 | 1/2014 | Hardin et al. | |
| 2014/0211255 A1* | 7/2014 | Takasu | G06F 3/1236 358/1.15 |
| 2014/0379564 A1 | 12/2014 | Hsu | |
| 2015/0106213 A1 | 4/2015 | Guen | |
| 2015/0287010 A1* | 10/2015 | Hasegawa | G06Q 20/20 705/21 |
| 2015/0302377 A1* | 10/2015 | Sweitzer | G06Q 20/204 705/17 |
| 2017/0004475 A1 | 1/2017 | White et al. | |
| 2017/0109721 A1 | 4/2017 | Kim et al. | |
| 2018/0096329 A1* | 4/2018 | Hamilton | G06Q 20/322 |
| 2019/0005477 A1* | 1/2019 | Sanders | H04W 4/80 |

FOREIGN PATENT DOCUMENTS

| | | |
|---|---|---|
| EP | 2871619 A1 | 5/2015 |
| EP | 2871619 A4 | 2/2016 |
| EP | 2996095 A1 | 3/2016 |
| EP | 2680243 B1 | 4/2021 |
| GB | 238450 A | 8/1925 |
| GB | 2384350 A | 7/2003 |
| WO | WO-2017056091 A1 * | 4/2017 |
| WO | 2018197891 A1 | 11/2018 |

OTHER PUBLICATIONS

Foreign Communication from a Related Counterpart Application, GB Search Report dated Oct. 5, 2017, GB Application No. GB1706773.7 filed on Apr. 28, 2017.

Foreign Communication from a Related Counterpart Application, International Search Report and Written Opinion dated Jul. 11, 2018, International Application No. PCT/GB2018/051113 filed on Apr. 27, 2018.

United Kingdom Examination Report dated Dec. 17, 2021 in counterpart British Patent Application No. 2117541.9 (4 pages, in English).

Anonymous: "Real-time locating system—Wikipedia", Feb. 28, 2016 (Feb. 28, 2016), XP055331769, Retrieved from the Internet: URL:https://e.wikipedia.org/w/index.php?title=Real-time_locating_system&oldid=707378632 [ retrieved on Jan. 3, 2017].

Anonymous: "Wikipedia—Indoor positioning system", Oct. 4, 2014 (Oct. 4, 2014), XP055622412, Retrieved from the Internet: URL:https://en.wikipedia.org/w/index.php?title=Indoor_positioning_system&oldid=628151558 [retrieved on Sep. 16, 2019].

Extended European Search Report issued in European Application No. 23171596.2 dated Jul. 18, 2023 (11 pages).

* cited by examiner

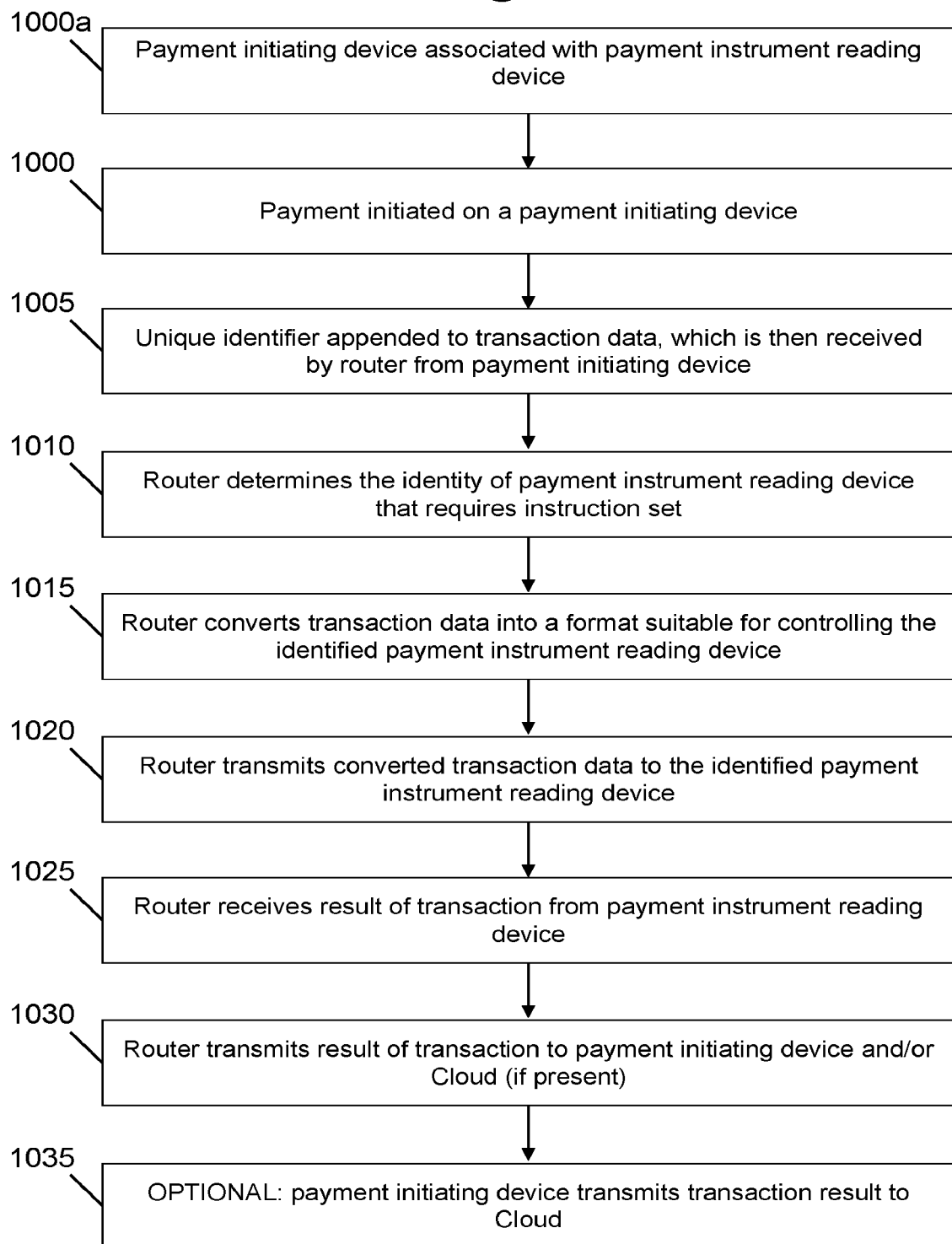

ELECTRONIC TRANSACTION PROCESSING SYSTEMS AND METHODS

CROSS-REFERENCE TO RELATED APPLICATION(S)

The present application is a continuation of and claims the benefit of priority to U.S. Non-provisional patent application Ser. No. 16/609,154, filed on Oct. 28, 2019, which is a filing under 35 U.S.C. 371 as the National Stage of International Application No. PCT/GB2018/051113, filed Apr. 27, 2018, entitled "ELECTRONIC TRANSACTION PROCESSING SYSTEMS AND METHODS," which claims priority to Great Britain Application No. GB 1706773.7 filed with the Intellectual Property Office of Great Britain on Apr. 28, 2017, all of which are incorporated herein by reference in their entirety for all purposes.

FIELD OF INVENTION

This invention relates generally to the field of electronic transactions, and in particular to systems and methods for processing a transaction that involves a payment initiating device and a payment instrument reading device that are not in direct communication with one another.

BACKGROUND

Electronic payments using payment instruments such as credit cards, debit cards and virtual payment cards provisioned on a mobile device are ubiquitous in the modern world. Electronic payments typically involve a customer (also referred to herein as a user) presenting a payment instrument (virtual or physical) such as a credit or debit card to a payment instrument reading device such as a Pin Entry Device ('PED') to facilitate payment. The payment instrument reading device is typically linked directly via a wired connection to a payment initiating device, which may be referred to as a Point of Sale (POS) terminal in the art. The payment initiating device is typically a customised computing device that includes the necessary software and hardware to control the payment instrument reading device in order to set up an electronic payment. Without this direct link, the payment instrument reading device has no knowledge of the transaction details held by the payment initiating device, and in arrangements without this direct link transaction information typically has to be manually entered into the payment instrument reading device.

A typical electronic payment in a system having a payment instrument reading device such as a PED and a payment initiating device such as a POS terminal comprising a customised desktop computer may proceed as follows. A customer attends a payment point where the POS terminal is located. The POS terminal is linked via a wired connection to the PED. An operator such as a sales assistant enters information relating to the item(s) that the customer wishes to purchase into the POS terminal, perhaps using a device like a barcode scanner. The entered information usually includes at least an identification of the item (e.g. the name of the item and/or an item code) and the price of the item. Once all of the items have been entered, the POS terminal sends commands to the PED via the wired connection that cause the PED to initiate a payment taking mode. The payment taking mode may require the operator to manually enter the amount due into the PED using the PED's keypad. As used herein the term 'item' is understood to include both products and services.

Once the amount due is displayed on the PED, the customer then proceeds to pay for the items using their payment instrument. In the case of a PED, this process can involve the customer entering their payment instrument into a card reading slot provided in the PED, and then entering a numerical Personal Identification Number (PIN) into the PED to authenticate the payment. This information is sent to a payment gateway which is a server that is associated with one or more organisations that process electronic payments (often referred to in the art as 'acquirers') and a result is returned indicating success or failure of the transaction.

A problem with this type of arrangement is that each payment initiating device must have the necessary hardware and software installed to control the payment instrument reading device that it is connected to. This increases both the initial cost and operating cost of each payment initiating device, and means that it is not possible to use non-customised 'commercial off the shelf' (COTS) hardware as a payment initiating device.

A related problem is that upgrading payment taking systems can be time consuming and costly because introducing new or updated payment instrument reading devices usually also requires a technician to update at least the corresponding software on the payment initiating device, and possibly also to install and configure additional hardware. Additionally, the need to have specific software installed on the payment initiating device for a particular type of payment instrument reading device means that it may not be possible to quickly swap a malfunctioning payment instrument reading device with a functioning payment instrument reading device of a different type. Hosting the payment initiating device software remotely in a Cloud can mitigate these problems, but in that case it is difficult for the software to directly control the payment instrument reading device that is coupled to the payment initiating device. Specifically, the lack of a local ('client') software application on the payment initiating device means that it is difficult for the payment initiating device (as directed by the Cloud application) to interface to a payment instrument reading device via a local connection (e.g. serial connection, Bluetooth connection, etc.) In principle, modifications could be made to the payment instrument reading device and/or the network structure at the premises where the payment initiating device is present to allow communication with the Cloud based software application, but these modifications are not practically feasible at least because of cost and scalability issues.

Another problem with a system incorporating a payment initiating device is that the need for a direct connection to the payment instrument reading device places restrictions on the physical layout of the system. The payment initiating device requires a designated area furnished with the necessary power outlets, network access ports and the like, which often takes the form of a counter. This static arrangement means that customers have to queue up and wait to use a payment initiating device in order to make payments. Long queues are undesirable in many environments having electronic payment taking facilities, e.g. an in-store environment.

Some systems have removed the payment initiating device such that electronic payments are processed using just a portable payment instrument reading device. While offering some improvements, these systems present their own problems. One particular problem is that the absence of a payment initiating device in the payment initiating process means that an operator has to enter in payment information into the portable payment instrument reading device before each payment can be made. In the case of a PED, this usually involves the operator manually entering some data using a keypad, such as the amount due or a transaction identifier. The operator usually has to manually read this information from another source, e.g. the customer's bill or the like, and then manually enter this information into the PED, and this rekeying of information leads to a slow payment process. This is particularly the case in a restaurant type setting where customers may wish to split a bill, requiring the operator to enter multiple different amounts for payment as each customer pays their portion of the bill. Manual entry of data is also error prone, possibly resulting in an erroneous charge to a customer. Additionally, in such cases the transaction response (e.g. a Response Code or Authentication Code as known in the art) remains with the portable payment instrument reading device and is not transmitted back to other components of the system such as a POS system or other such information repository.

Other systems have removed the payment initiating device and payment instrument reading device entirely in favour of a remote 'card not present' type payment. This type of payment usually involves the customer providing details relating to their payment instrument via an interface that does not include a payment instrument reading device in the same manner as e.g. online transactions over the Internet. While offering flexibility, this type of system is at greater risk to fraudulent transactions than systems involving a payment instrument reading device because in this type of system any party in possession of a payment instrument can immediately use the payment instrument to make payments without knowledge of the authorised user's PIN or other such secure information. Additionally, as known in the art, 'card not present' transactions typically attract higher interchange fees, increasing the operating costs of this type of system.

The above illustrates that no electronic payment taking solution exists in the art which is simultaneously convenient, flexible, low cost, error-free and secure.

SUMMARY OF THE INVENTION

The present invention provides systems and methods in which transaction information is sent from a payment initiating device to a payment instrument reading device that is not directly connected to the payment initiating device, via a communication router. The communication router is configured to receive the transaction data and, optionally, to convert the transaction data into a format that is suitable for controlling the payment instrument reading device. The communication router then transmits the converted data to the payment instrument processing device. If there is a plurality of payment instrument reading devices, the transaction data is automatically sent to the correct one of the plurality of payment instrument reading devices based on information set out in a mapping table that is accessible by the communication router. The mappings in the mapping table can be static mappings or dynamic mappings that change based on transient couplings between various ones of the payment instrument reading devices and the one or more payment initiating device(s). The dynamic mappings may be defined according to proximity of the various payment instrument reading devices to the one or more payment initiating devices(s). The communication router may further transmit transaction information from the payment instrument reading device(s) to an Acquirer's server for processing. The result of a transaction may also be sent back from the Acquirer's server to the payment initiating device via the communication router, if desired.

In a first aspect, the present invention provides a router suitable for use in a system for processing transactions involving a payment instrument, wherein the router is communicatively coupleable to one or more payment initiating devices and to one or more payment instrument reading devices, wherein the one or more payment instrument reading devices are each configured to read the payment instrument, the router comprising a communication controller configured to communicate with each of the one or more payment instrument reading devices; wherein the router is configured to: receive a transaction request from a first payment initiating device that is one of the one or more payment initiating devices; query a mapping table to identify a first payment instrument reading device from the one or more payment instrument reading devices, wherein the first payment instrument reading device is associated with the first payment initiating device in the mapping table; and transmit, using the communication controller, the transaction request to the first payment instrument reading device.

In a second aspect, the invention provides a system for processing transactions involving a payment instrument, comprising: a router communicatively coupled to a mapping table; one or more payment initiating devices; one or more payment instrument reading devices; and one or more pairing modules, each pairing module communicatively coupleable to any one of the one or more payment initiating devices and to any one of the one or more payment initiating devices, and each pairing module communicatively coupled to the router; wherein each pairing module is configured to: communicate with a selected one of the one or more payment instrument reading devices to receive a payment instrument reading device unique identifier corresponding to the selected one of the one or more payment instrument reading devices; transmit the received unique identifier to the router for storage in the mapping table; and transmit a further unique identifier to the router for storage in the mapping table, the further unique identifier corresponding to a pairing module unique identifier that corresponds to the pairing module; and wherein the router is configured to store the received payment instrument reading device unique identifier and the received further unique identifier in the mapping table in a manner such that they are associated with one another.

In a third aspect, the invention provides a system for processing transactions involving a payment instrument, comprising: a router communicatively coupled to a mapping table; one or more payment initiating devices; one or more payment instrument reading devices; one or more beacons, each beacon configured to broadcast a unique signal that is receivable by each of the one or more payment initiating devices, each beacon having an associated unique beacon identifier; and wherein the one or more payment initiating devices each include a locationing application installed thereon, the locationing application configured to: identify a selected one of the one or more beacons; and transmit a transaction request to the router, the transaction request including the unique beacon identifier that is associated with the selected one of the one or more beacons; wherein the router is configured to: receive the transaction request; query the mapping table to identify a selected one of the one or more payment instrument reading devices based on the received unique beacon identifier; and transmit the transaction request to the selected one of the one or more payment instrument reading devices.

In a fourth aspect, the invention provides a system for processing an electronic transaction involving a payment instrument, comprising: a router communicatively coupled to a mapping table; one or more payment initiating devices; one or more payment instrument reading devices; one or more beacons, each beacon configured to broadcast a unique signal that is receivable by each of the one or more payment initiating devices; wherein the one or more payment initiating devices each include a locationing application installed thereon, the locationing application configured to: identify a selected one of the one or more beacons; and transmit a transaction request to the router, the transaction request including a payment instrument reading device unique identifier associated with a selected one of the one or more payment instrument reading devices that is associated with the selected one of the one or more beacons; wherein the router is configured to: receive the transaction request; and transmit the transaction request to the selected one of the one or more payment instrument reading devices.

In a fifth aspect, the invention provides a system for processing an electronic transaction involving a payment instrument, comprising: a payment initiating device comprising a storage module; a payment instrument reading device, wherein the payment initiating device is communicatively coupleable to the payment instrument reading device when the payment instrument reading device is within a communication range of the payment initiating device; wherein the payment initiating device is configured to: establish a communication channel with the payment instrument reading device when the payment instrument reading device is within communication range of the payment initiating device; receive, from the payment instrument reading device, at least a unique identifier that uniquely identifies the payment instrument reading device; and store the unique identifier in the storage module.

In a sixth aspect, the invention provides a computer-implemented method of processing transactions involving a payment instrument, comprising: receiving, at a router, a transaction request from a first payment initiating device, the first payment initiating device being part of a payment initiating device group of at least one payment initiating device; querying a mapping table to identify a first payment instrument reading device that is associated with the first payment initiating device, the first payment instrument reading device being part of a payment instrument reading device group of at least one payment instrument reading device; and transmitting, via the router, the transaction request to the first payment instrument reading device.

In a seventh aspect, the invention provides a computer-implemented method for processing transactions involving a payment instrument, comprising: receiving, at a pairing module, a payment instrument reading device unique identifier corresponding to a selected payment instrument reading device, the selecting payment instrument reading device being part of a payment instrument reading device group comprising at least one payment instrument reading device, wherein the pairing module is communicatively coupleable to any payment instrument reading device within the payment instrument reading device group; transmitting the received unique identifier to a router for storage in a mapping table, the router communicatively coupled to the mapping table; and transmitting a further unique identifier to the router for storage in the mapping table, the further unique identifier corresponding to a pairing module unique identifier that corresponds to the pairing module, wherein the payment instrument reading device unique identifier and the further unique identifier are stored in the mapping table in a manner such that they are associated with one another.

In an eighth aspect, the invention provides a computer-implemented method for processing transactions involving a payment instrument, comprising: broadcasting, using a beacon, a unique signal that is receivable by each member of a payment initiating device group comprising at least one payment initiating device, the beacon having an associated unique beacon identifier; identifying the beacon using a locationing application installed on a selected payment initiating device from the payment initiating device group; transmitting, from the selected payment initiating device, a transaction request to a router, the transaction request including the unique beacon identifier, wherein the router is communicatively coupled to a mapping table; receiving, at the router, the transaction request; querying the mapping table to identify a selected payment instrument reading device from a payment instrument reading device group comprising at least one payment instrument reading device, the identification based on the received unique beacon identifier; and transmitting the transaction request to the selected payment instrument reading device.

In a ninth aspect, the invention provides a computer-implemented method for processing transactions involving a payment instrument, comprising: broadcasting, using a beacon, a unique signal that is receivable by each member of a payment initiating device group comprising at least one payment initiating device, the beacon having an associated unique beacon identifier; identifying the beacon using a locationing application installed on a selected payment initiating device from the payment initiating device group; transmitting, from the selected payment initiating device, a transaction request to a router, the transaction request including a payment instrument reading device unique identifier corresponding to a selected payment instrument reading device that is associated with the beacon, and wherein the router is communicatively coupled to a mapping table; receiving, at the router, the transaction request; and transmitting the transaction request to the selected payment instrument reading device.

In a tenth aspect, the invention provides a computer-implemented method of processing transactions involving a payment instrument, comprising: placing a payment instrument reading device within a communication range of a payment initiating device; establishing a communication channel between the payment instrument reading device and the payment initiating device; transmitting, from the payment instrument reading device, at least a unique identifier that uniquely identifies the payment instrument reading device; receiving, at the payment initiating device, at least the unique identifier; and storing the unique identifier in a storage module that is part of the payment initiating device.

In an eleventh aspect, the invention provides a device for pairing an electronic payment initiating device with an electronic payment card reading device, comprising: a first communication module configured to communicate with the electronic payment card reading device; a second communication module configured to communicate with the electronic payment initiating device; and a third communication module configured to communicate with the router of the first aspect; wherein the device is configured to: receive, via the first communication module, a unique identifier from the electronic payment card reading device; and transmit the unique identifier to the router via the third communication module.

Preferred feature of the various aspects are set out in the appended dependent claims.

BRIEF DESCRIPTION OF THE DRAWINGS

Embodiments of the present invention are now described, by way of example only, with reference to the accompanying drawings, in which:

FIG. 4 is a flow diagram showing the operation of the pairing module of FIG. 3a;

FIG. 10 is a flow diagram showing a mode of operation of the system of FIG. 9.

DETAILED DESCRIPTION OF EMBODIMENTS

Figure 1:
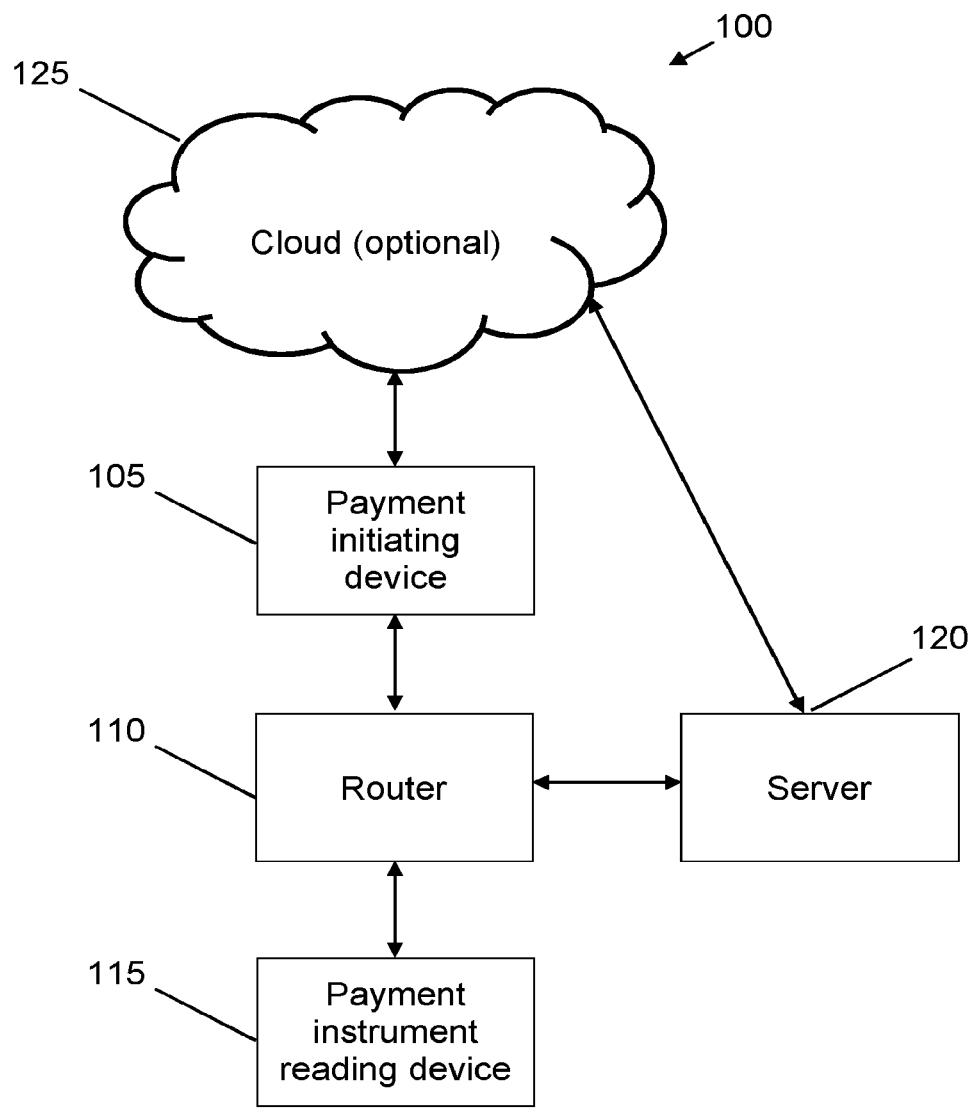
FIG. 1 is a schematic diagram of a system for handing electronic payments according to a first embodiment.

FIG. 1 shows a schematic diagram of a system 100 according to a first embodiment. System 100 includes a payment initiating device 105, a communication router 110, a payment instrument reading device 115, a server 120 and optionally a connection to a Cloud 125 from one or both of payment initiating device 105 and server 120. As shown, payment initiating device 105 is communicatively coupled to router 110 and optionally also communicatively coupled to Cloud 125. Router 110 is communicatively coupled to payment instrument reading device 115 and communicatively coupled to server 120. Router 110 may also be communicatively coupled to Cloud 125, if present. Server 120 may additionally or alternatively be coupled to Cloud 125, if present. System 100 may optionally also include one or more pairing devices 300 as described later in this specification in connection with FIGS. 3a, 3b and 4.

It will be appreciated that system 100 is not restricted to a single payment initiating device and to a single payment instrument reading device, and that system 100 may include a plurality of payment initiating devices like payment initiating device 105 and/or a plurality of payment instrument reading devices like payment instrument reading device 115. In some instances there is a one to one relationship between the payment initiating devices and the payment instrument reading devices and in other instances there are more payment initiating devices than payment instrument reading devices. In the latter case, system 100 preferably includes at least one pairing device 300 as described later in connection with FIGS. 3a and 3b. It is also possible to have more payment instrument reading devices than payment initiating devices.

System 100 is preferably used in implementations in which one or more payment initiating devices have a fixed location in the premises in which they are deployed (e.g. a merchant's premises) and the one or more payment instrument reading devices are either in a fixed location or are moveable within the premises. A moveable payment instrument reading device is at times referred to herein as a 'mobile' payment instrument reading device. It will be understood that the word 'mobile' in this context does not imply that the payment instrument reading device must be a mobile telephone or other such device.

Payment initiating device 105 can be any electronic device that is able to send information across a network using a network protocol that supports transmission of a data file. Preferably payment initiating device 105 supports the Hypertext Transfer Protocol (HTTP) and/or derivatives thereof, e.g. HTTPS. Examples of devices suitable for use as payment initiating device 105 include but are not limited to a desktop computer, a laptop computer, a tablet computer, a mobile telephone, a Personal Digital Assistant, a wearable computer and an Internet connected button. Other suitable devices will become apparent to a skilled person having the benefit of the present disclosure. Payment initiating device 105 may be a POS terminal.

Advantageously, payment initiating device 105 can be a Commercial Off The Shelf (COTS) device, meaning that it has not been customised in any way to perform the function of a payment initiating device; i.e. to initiate electronic payments. Initiation may involve determining an amount for the transaction and triggering a payment, for example. Examples of 'customisation' include but are not limited to installation of software and/or hardware expressly for the purpose of communicating with and/or controlling payment instrument reading device 115. Payment initiating device 105 may also be a 'thin client' device, which is a term of art meaning that the device includes only a minimal amount of computing resources because most data processing is performed at a remote server; e.g. by one or more applications hosted by Cloud 125.

Payment initiating device 105 preferably has a web browser application installed on it. Installation can be achieved in the manner well known in the art. The web browser application can be a conventional web browser application as is well known to a skilled person, e.g. Internet Explorer™, Google Chrome™, Mozilla Firefox®, Safari®, etc. The web browser may come pre-installed with the operating system of payment initiating device 105. In the case that a web browser application is installed, this may be used as the mechanism for transmitting the data file, e.g. using a HTTP POST request. However, a web browser application is not essential because other mechanisms for generating a HTTP POST request can alternatively be used. Equivalents to the HTTP POST request in other network communication protocols, e.g. Telnet, FTP, can alternatively be used. It will therefore be appreciated that any references herein to entities that are part of the HTTP protocol can alternatively be replaced with equivalents using other known network communication protocols without departing from the scope of the present invention.

Payment initiating device 105 is communicatively coupled to router 110 via any current or future communication technology. For example, in the first embodiment, payment initiating device 105 is connected to router 110 via either a physical, wired connection such as an Ethernet cable as is well known in the art or a wireless WiFi connection as is also known in the art. Alternatively, payment initiating device 105 can be connection to router 110 via other types of wireless connection including any of a Bluetooth® connection, a Bluetooth Low Energy® (BLE) connection, a ZigBee® connection, and the like. Router 110 is described in more detail later in this specification in connection with FIG. 2.

Payment initiating device 105 may optionally also be communicatively coupled to Cloud 125. As used herein, the term 'Cloud' refers to a pool of computing resources that is located remotely from payment initiating device 105. For example, Cloud 125 may comprise one or more servers that are configured to provide ('host') software applications, which software applications may enable the taking of electronic payments. The one or more servers may be located remotely from the premises at which payment initiating device 105 is located (e.g. at a data centre), or the one or more servers may be located at the same premises as payment initiating device 105 (e.g. a merchant server). Payment initiating device 105 can be communicatively coupled to Cloud 125 via any suitable communication technology, including but not limited to a TCP/IP connection over the Internet.

A connection to Cloud 125 is used in the case that payment initiating device 105 is a thin client device or otherwise does not have the necessary software application(s) installed locally to take an electronic payment, as in that configuration Cloud 125 provides the necessary software application(s) to enable payment initiating device 105 to make a sale and potentially enable communication to an Acquirer's server. As is known in the art, an Acquirer's server (or 'payment gateway') processes an electronic transaction and provides a result (typically approved or declined). Providing software application(s) in Cloud 125 advantageously means that payment initiating device 105 requires minimal configuration; i.e. no specific hardware or software modifications are needed to allow payment initiating device 105 to implement the present invention. Additionally, updates to the software application(s) can be performed centrally in the Cloud and the changes automatically filtering through to the payment initiating devices as soon as the updated software application goes live.

It will be appreciated that Cloud 125 can be omitted from system 100 in the case where payment initiating device 105 has the necessary software installed to initiate and process a payment; i.e. in cases where the application(s) initiating and processing a payment that would otherwise have been provided by Cloud 125 is/are installed locally on payment initiating device 105.

System 100 also includes a payment instrument reading device 115 that is communicatively coupled to router 110. Payment instrument reading device 115 can be connected to router 110 via a physical, wired connection such as an Ethernet cable as is well known in the art. Alternatively, payment instrument reading device 115 can be connection to router 110 via a wireless connection including any of a WiFi connection, a Bluetooth® connection, a Bluetooth Low Energy® (BLE) connection, a ZigBee® connection, and the like. In the first embodiment, the connection is a WiFi connection. In the interests of clarity only a single payment instrument reading device 115 is shown in FIG. 1, but it will be appreciated that a plurality of payment instrument reading devices that are identical or similar to payment instrument reading device 115 can be part of system 100 and also that each payment instrument reading device can be simultaneously communicatively coupled to router 110.

Payment instrument reading device 115 can be any device capable of reading a payment instrument or other mechanism like a virtual payment instrument that is suitable for making an electronic transaction. For example, in the first embodiment payment instrument reading device 115 is a Pin Entry Device (PED) as is well known in the art. The PED may have the facility to make one or both of 'chip and PIN' payments and 'contactless' payments, both of which are well known in the art. Whatever the form of payment instrument reading device 115, it preferably supports relevant payment standards such as the EMV technical standard that is well known in the art. Payment instrument reading device 115 can either be static, i.e. fixed in place, or mobile, i.e. freely movable around the premises that it is installed in.

As used herein, the term 'payment instrument' is understood to refer to a set of payment credentials supplied for the purposes of payment. This may be embodied by a physical payment card of the type well known in the art, or by a data storing code such as a QR code, or by a Sort Code and Account number either typed manually or provided by e.g. an NFC interface, or a unique identifier associated with a user such as a mobile phone number or email address. It may also be that a payment instrument is proxied by biometric data such as a biometric pattern corresponding to a user's face, fingerprint, finger vein pattern or palm vein pattern. Payment instrument can also refer to a virtual payment instrument such as a payment card provisioned onto an electronic device, e.g. a smartphone, tablet, or wearable device that has provisioning capabilities. Other equivalent mechanisms to those outlined above for making electronic payments that require a reading device also fall within the definition of a payment instrument.

Advantageously, payment instrument reading device 115 does not need any specific hardware or software modifications in order to implement the present invention. Instead, payment instrument reading device 115 can be any 'off the shelf' (COTS) device capable of reading a payment instrument.

Router 110 is also preferably communicatively coupled to server 120. Server 120 provides a payment gateway as is well known in the art. In brief, a payment gateway provides a mechanism for the 'back end' portion of the electronic payment process, and facilitates all of the communication between the various entities such as an acquirer and a bank that are necessary to enable electronic payments to be performed. Server 120 itself is conventional and is not described in further detail here. Optionally, server 120 can be communicatively coupled to Cloud 125 to allow data relating to a transaction to be shared with Cloud 125. This data could be, for example, data relating to a product or service that was purchased. Other data that can be transmitted to Cloud 125 by server 120 will become apparent to a skilled person having the benefit of the present disclosure.

Figure 2:
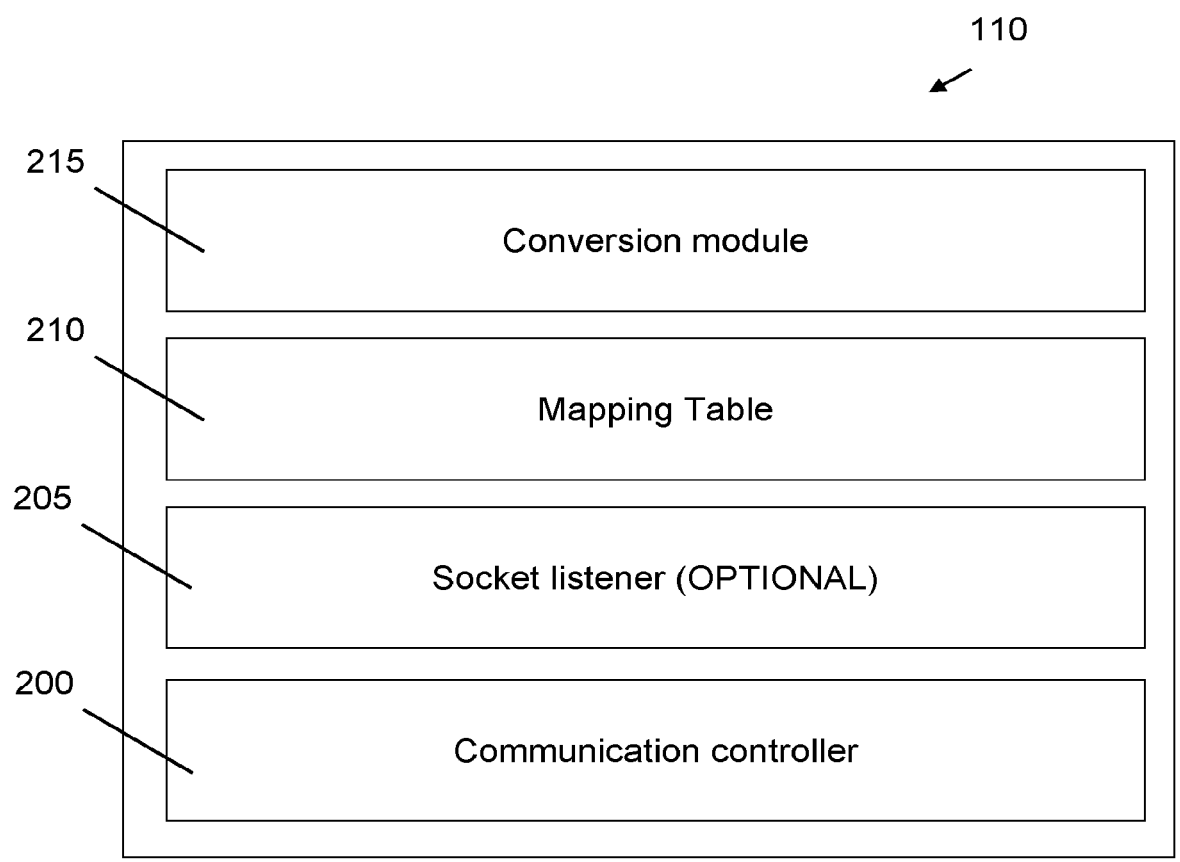
FIG. 2 is a schematic diagram of the router that is part of the system of FIG. 1.

Referring now to FIG. 2, router 110 is shown in more detail. It will be appreciated that, in the interests of brevity and clarity, a number of conventional parts of router 110 have been omitted from FIG. 2.

Router 110 functions to support communication between payment instrument processing device 105, payment instrument reading device 115 and, optionally, also server 120. Many aspects of router 110 required to perform data packet routing functions, such as a Network Interface Controller (NIC) and/or a Wireless Network Interface Controller (WNIC), etc., are conventional and will be well known to a skilled person.

In addition to conventional hardware and software required for router 110 to provide routing functionality, router 110 also includes a communication controller 200 that is configured to communicate with payment instrument reading device 115. Communication controller 200 may be realised entirely in software, entirely in hardware, or a combination of both software and hardware. For example, communication controller 200 may comprise a physical communication means such as a serial port or a wired LAN controller. Communication controller 200 may alternatively or additionally comprise a wireless LAN controller and/or a Bluetooth controller. Communication controller 200 supports one or more communication protocols such as Internet Protocol (IP).

Communication controller 200 includes whatever hardware and/or software is required for router 110 to communicate with payment instrument reading device 115 using a communication protocol that is supported by payment instrument reading device 115. The software and/or hardware that forms part of communication controller 200 will be readily determined by a skilled person according to the specifics of the situation that they are presented with, including but not limited to the type or types of communications protocols supported by the particular payment instrument reading device(s) that are available. Preferably, router 110 is configured to support a number of different communication protocols so that router 110 is advantageously able to communicate with various different types of payment instrument reading devices.

In the first embodiment, communication controller 200 includes a wired LAN controller that manages wired connections to one or more payment instrument reading devices via an Ethernet cable, such as a RJ45 cable. Communication controller 200 further includes a serial communication connector according to the RS-232 standard as is known in the art. Communication controller 200 may alternatively or additionally include a WiFi controller for connection to one or more payment instrument reading devices via WiFi.

Router 110 optionally includes a socket listener 205. Socket listeners per se are well known in the art and hence socket listener 205 is not described in detail. It is sufficient to specify here that socket listener 205 is configured to listen for incoming requests from payment initiating device 105. The precise details of this configuration, such as which port(s) socket listener 205 is configured to listen to, will be readily chosen by a skilled person having the benefit of the present disclosure. It will be appreciated that socket listener 205 can simultaneously listen for incoming transaction data from a plurality of payment initiating devices that are in communication with router 110. Socket listener 205 is preferably included in router 110 where payment initiating device 105 communicates with router 110 using the HTTP protocol or derivatives thereof, e.g. HTTPS.

Router 110 is capable of obtaining information from a mapping table 210. The operation The router 110 may include a storage device for storing the mapping table and/or a connection mechanism for connecting to another device (e.g. a remote device) that stores the mapping table 210. Mapping table 210 stores information relating to each payment initiating device that router 110 is connected to. The information stored in mapping table 210 allows router 110 to determine which of a set of payment instrument reading devices is associated with a particular payment initiating device. There may be a single payment instrument reading device or multiple payment instrument reading devices in the set. Such associations are referred to hereafter as 'pairings'. It will be appreciated that mapping table 210 need not be stored physically within router 110. What is instead required is that, regardless of where mapping table 210 is stored, router 110 can readily access mapping table 210 when necessary. Mapping table 210 may therefore be stored remotely from router 110, e.g. on a remote server such as a merchant server. The process of accessing mapping table 210 to retrieve information from the mapping table may be referred to as 'querying' the mapping table. It will also be appreciated that router 110 is capable of causing data to be written to mapping table 210 such that mapping table 210 can be updated by router 110. Here, 'updating' includes all forms of writing data, including but not limited to adding data, editing existing data and deleting data.

A simplified example of mapping table 210 is shown in Table 1.

TABLE 1

| Unique identifier of payment initiating device | Corresponding payment instrument reading device |
|---|---|
| POS1 | DEVICE1 |
| POS2 | DEVICE2 |
| POS3 | DEVICE3 |

In the example of Table 1, each incoming request from a payment initiating device is characterised by an identifier that identifies the POS (see, for example, POS1, POS2, POS3 in Table 1). Each unique identifier of a payment initiating device is in the mapping table 210 and is associated with a payment instrument reading device according to the mapping table 210. The identifier could be any type of identification information such as a payment initiating device number or an IP address. Any other information that uniquely identifies a payment instrument reading device can be used in place of payment initiating device number or IP address. Where an assigned label such as 'DEVICE1' as shown in the above table is used, this can be included as part of an HTTP POST payload and/or added to the HTTP header. Mapping table 210 thus defines the pairing between a payment initiating device and a payment instrument reading device.

For example, if router 110 receives an incoming communication including the unique identifier POS3, it performs a lookup in mapping table 210 to determine that DEVICE3 is the payment instrument reading device that is currently paired with the payment initiating device from which the request originated. Alternatively, if the mapping table contains IP addresses as unique identifiers for the payment initiating devices, and a predetermined IP address (in this case one that is associated with DEVICE 3), for example, 192.168.0.4 is received as an incoming communication to the router, it performs a lookup in mapping table 210 to determine that DEVICE3 is the payment instrument reading device that is currently paired with the payment initiating device from which the request originated. Subsequent operations of router 110 in connection with this particular request are therefore directed to payment instrument reading device DEVICE3. In the first embodiment, the requests are HTTP requests, but the invention is not limited in this manner and other communications protocols can instead be used.

The simplified example above is merely illustrative of one possible configuration for mapping table 210. Many variations are possible. A unique identifier corresponding to the originating payment initiating device could be tagged to the communication; e.g., where HTTP or a variant thereof is used, the unique identifier could form part of the HTTP POST payload and/or could be added to the HTTP header of the HTTP request. A skilled person having the benefit of the present disclosure will thus be able to devise many different forms for mapping table 210. Whatever the form, mapping table 210 allows router 110 to determine which payment initiating device sent a given communication and to which payment instrument reading device subsequent operations should be sent.

Mapping table 210 is not limited to storing the data discussed above, and any other data deemed useful by a skilled person can alternatively or additionally be stored in mapping table 210.

The pairing between a payment initiating device and a payment instrument reading device can be static or dynamic. Each case is discussed in turn below.

Case 1: Static Pairings

In this case the pairing between a given payment initiating device and a given payment instrument reading device is persistent, meaning that it remains constant for more than one transaction. That is, a PED is associated with a POS well ahead of when a transaction takes place. This case is preferred in implementations where there is the same number of payment initiating devices as payment instrument reading devices. Preferably, a payment instrument reading device is paired with the payment initiating device that it is physically closest to in the premises. Static pairings are particularly suited to a counter-style payment arrangement in which a particular payment instrument reading device is always located proximate a particular payment initiating device.

A static pairing is defined when the payment initiating device and payment instrument reading device are first introduced into system 100. The static pairing need only be defined once, and it will persist thereafter.

The static pairing can be generated by manually supplying the necessary pairing information to router 110 for storing in mapping table 210. For example, an operator could provide to router 110 a unique identifier corresponding to a first payment initiating device (e.g. IP address) and a unique identifier corresponding to a first payment instrument reading device (e.g. IP address) that is to be paired with the first payment initiating device. Provision of this information could be achieved by any suitable means known to the skilled person, including but not limited to accessing a configuration web page hosted on router 110 in a web browser and/or making use of a software application that is configured to transmit pairing information to router 110. Router 110 stores this information in mapping table 210 so that the necessary pairings are created.

The static pairing can alternatively be generated automatically. In this case, router 110 is configured to enter an 'automatic learning' mode in response to a specific 'training' signal from an operator. In the automatic learning mode, router 110 operates as follows:

1) Router 110 polls a first one of a set of payment instrument reading devices that it is connected to. The polling may include determining a unique identifier associated with the polled payment instrument reading device.
2) An operator identifies the payment instrument reading device that has been polled and determines which payment initiating device is to be associated with that payment instrument reading device. The determined payment initiating device is referred to hereafter in this example as the first payment initiating device, and the polled payment instrument reading device is referred to hereafter in this example as the first payment instrument reading device.
3) The operator initiates a training request from the first payment initiating device, where the training request includes a unique identifier that is associated with the first payment initiating device. The training request can be any signal that is recognised by router 110 as an indication that it should record the unique identifier of the first payment initiating device in mapping table 210 such that the first payment initiating device is paired with the first payment instrument reading device. In the first embodiment the training request is an HTTP request, and the unique identifier is the IP address of the first payment initiating device.
4) Router 110 records the unique identifier that was transmitted with the training request (e.g. IP address) in mapping table 210 such that it is associated with a unique identifier corresponding to the first payment instrument reading device. This action pairs the first payment initiating device with the first payment instrument reading device.
5) Router 110 repeats steps 1 to 4 for each payment instrument reading device that it is connected to, such that at the end of the training process each payment instrument reading device is paired with a corresponding payment initiating device. Router 110 may then automatically exit the automatic learning mode, or it may wait for a signal from an operator to exit the automatic learning mode.

It will be appreciated that in practice a combination of automatic and manual configuration may be used. For example, automatic configuration may be used to set up a system like system 100 when it is first installed at a premises. Thereafter, manual configuration may be used to amend the initial setup. Amendments include changing an existing pairing, deleting an existing pairing and adding a new pairing. It will thus be appreciated that a static pairing is not immutable and can be changed when necessary; for example, where a particular payment instrument reading device becomes faulty and is replaced with a different, functional payment instrument reading device, the pairing would be updated to pair the appropriate payment initiating device with the replacement payment instrument reading device.

Case 2: Dynamic Pairings

In this case the pairing between a given payment initiating device and a given payment instrument reading device is transient, meaning that it lasts only for the duration of one particular transaction. This case is preferred in implementations where there are more or less payment initiating devices than payment instrument reading devices. Dynamic pairings are particularly suited to arrangements where there are more payment initiating devices than payment instrument reading devices, meaning that the payment instrument reading devices have to be shared among the payment initiating devices.

It will be appreciated that dynamic pairings require a mechanism for updating mapping table 210 at the beginning of each transaction. Such a mechanism is termed a 'pairing module' and is shown and described in connection with FIGS. 3a and 3b later in this specification.

Router 110 may further include a conversion module 215, or router 110 may be communicatively coupled to a remote conversion module (not shown) that is not part of router 110 but is contactable by router 110 via a network connection (e.g. LAN, WAN, the internet, etc.). The remote conversion module may be hosted by Cloud 125, for example. Whether local or remote to router 110, the conversion module converts the transaction data received from the payment initiating device into a format that is suitable for controlling a payment instrument reading device to cause the payment instrument reading device to take an electronic payment. The operation of conversion module 215 is described below in connection with FIG. 5 (see step 515 in particular). Conversion module 215 comprises any combination of hardware and/or software that is able to carry out the requisite functions as described in connection with FIG. 5. It will be appreciated that conversion module 215 and its associated processing steps can be omitted in the case where the payment initiating device transmits transaction data that is already in a format that is suitable for controlling a payment instrument reading device such that no conversion is required.

Figure 3A:
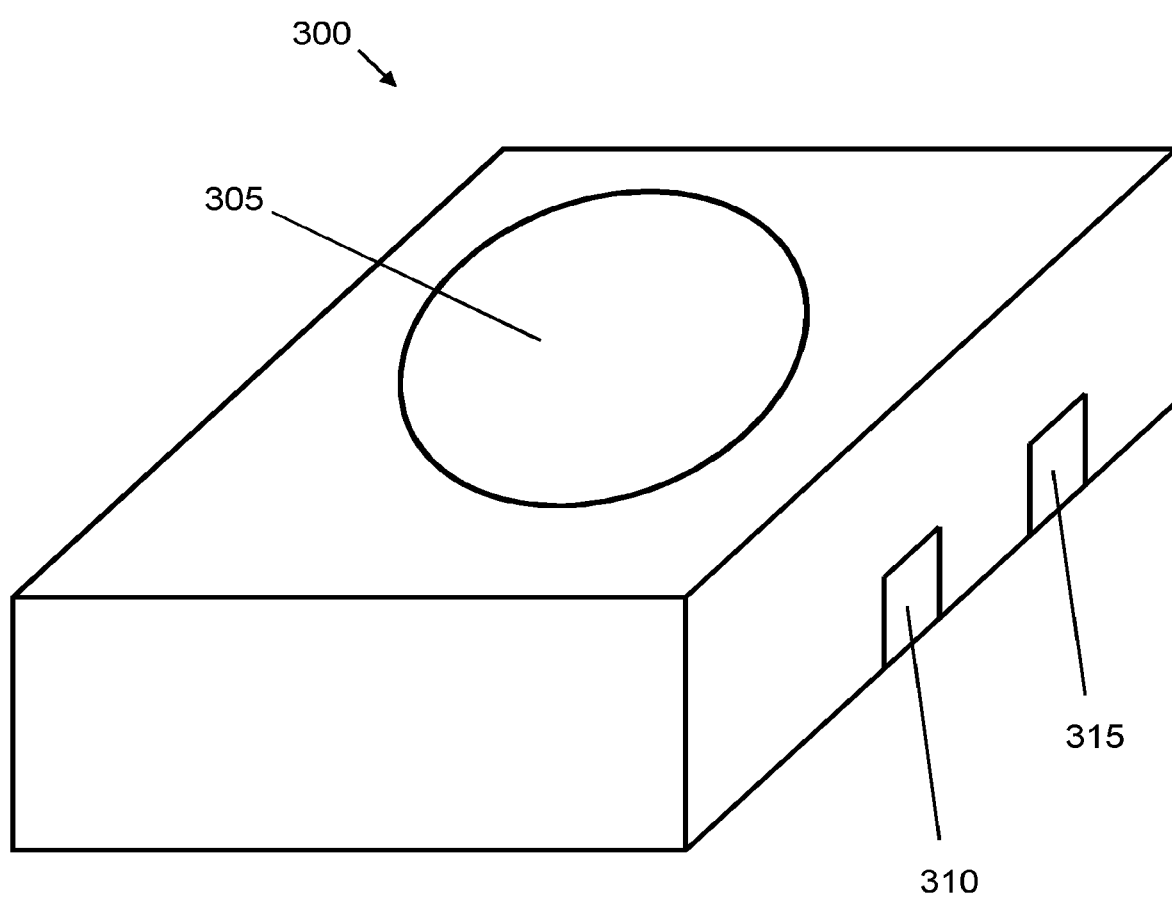
FIG. 3a is a schematic diagram of a paring module according to an embodiment.

FIG. 3a shows a schematic diagram of a device for pairing an electronic payment initiating device with an electronic payment instrument reading device. This device is referred to herein as 'pairing module 300'. Pairing module 300 is suitable for use with system 100 of the first embodiment, and in particular to create the dynamic pairings as discussed earlier.

Figure 3B:
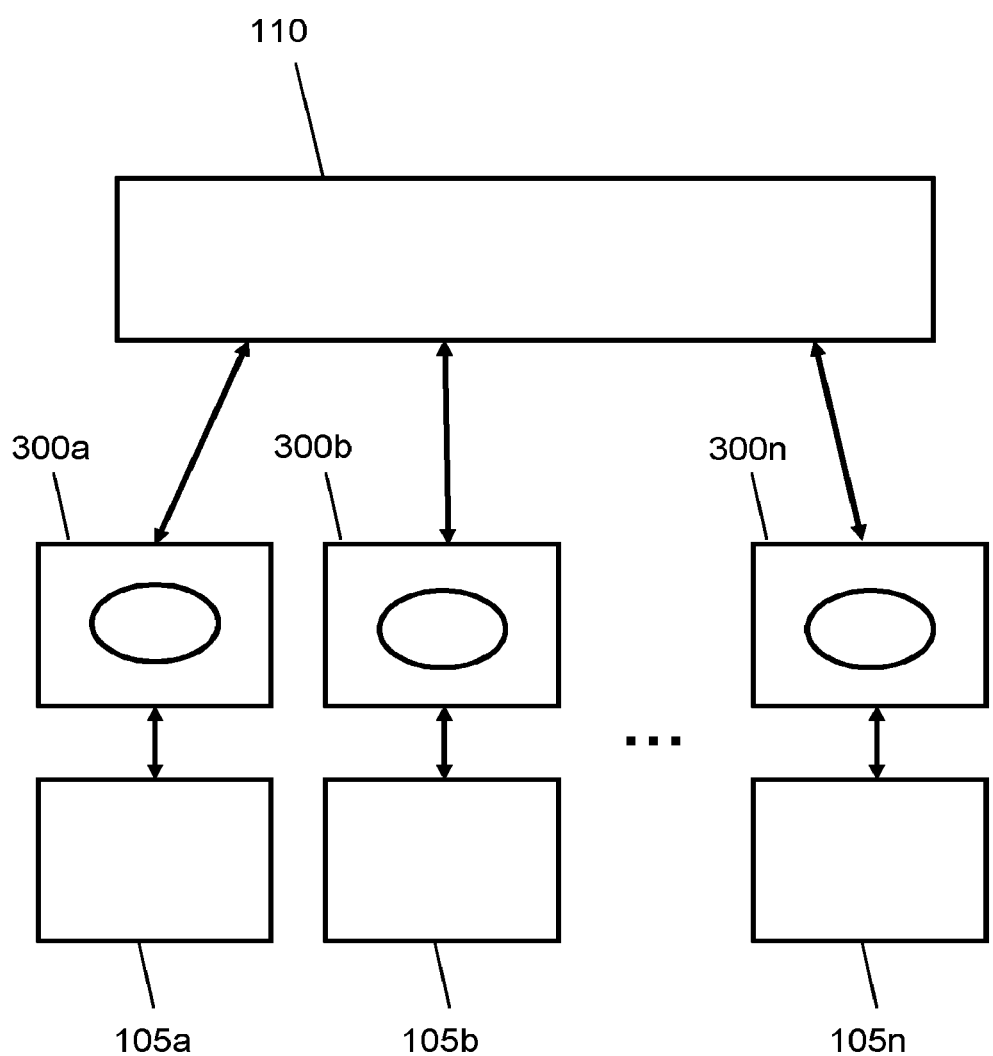
FIG. 3b is a schematic diagram showing integration of pairing modules like the pairing module shown in FIG. 3a into system 100.

The integration of pairing module 300 into system 100 is shown in FIG. 3b. Preferably, as shown in FIG. 3b, each payment initiating device 105a, 105b, . . . , 105n that is part of system 100 has an associated pairing module 300a, 300b, . . . , 300n, such that there is a one to one relationship between payment initiating devices and pairing modules. As shown in FIG. 3b, each pairing module 300a, 300b, . . . , 300n is communicatively coupled to router 110. This coupling can be wired or wireless using any known communication mechanism, e.g. wired LAN communication, WiFi, Bluetooth®, Bluetooth Low Energy® (BLE), etc. Pairing module 300 includes the conventional components (not shown) that are required to support communication with router 110, e.g. a wired or wireless Network Interface Controller. These conventional components will be readily selected by a skilled person.

Pairing module 300 is configured to manage the creation of dynamic pairings between individual payment initiating devices and individual payment instrument processing devices, as discussed under the heading 'case 2: dynamic pairings' above. Therefore, pairing module 300 is preferably used in implementations where there are more payment initiating devices than payment instrument reading devices such that dynamic pairing is required. However, there is no restriction on this and pairing module 300 can equally be used in a static pairing environment. Pairing module 300 can also be used in environments where there are more payment instrument reading devices than payment initiating devices, or in environments where there is the same number of payment initiating devices as payment instrument reading devices.

In the illustrated embodiment pairing module 300 takes the form of a square or rectangular pad similar in dimension to the form factor of e.g. a tablet computer, but it will be appreciated that this is merely a design choice and pairing module 300 can take any form considered suitable by a skilled person having regard to the specifics of a given situation.

Pairing module 300 includes a first communication module 305 that communicates with payment instrument reading device 115 using a communication technology, preferably a wireless communication technology. In the present embodiment first communication module 305 makes use of Radio-Frequency Identification ('RFID') technology. Specifically, first communication module 305 comprises an RFID-enabled region located on an outer surface of pairing module 300. This could be provided by an RFID-enabled sticker provided on a surface of the pairing module, preferably the upper surface. The RFID-enabled region includes at least one RFID chip as is well known in the art. In use, payment instrument reading device 115 is placed close to, and preferably directly on top of, the RFID-enabled region to provide the necessary proximity to enable RFID communication between pairing module 300 and payment instrument reading device 115. Preferably, once the RFID communication channel is established, payment instrument reading device 115 transmits a unique identifier over the RFID channel to first communication module 305. In the present embodiment the unique identifier is a unique label assigned to the payment instrument reading device (e.g. 'DEVICE1'), but this is not essential and other unique identifiers known to the skilled person such as an IP address (if the payment instrument reading device has one) or a MAC address can be used instead. The transmitted unique identifier can be used to determine the identity of payment instrument reading device 115.

It will be appreciated that, in the illustrated embodiment, payment instrument reading device 115 may need to be configured for RFID communication, e.g. by placing a RFID-enabled sticker on the base of payment instrument reading device 115. Embodiments making use of pairing module 300 are thus advantageously backwards-compatible. In the illustrated embodiment first communication module 305 operates using known RFID communication protocols and standards, e.g. Near Field Communication (NFC) protocols.

RFID is a preferred technology for first communication module 305 because it is short-range, such that the chance of a payment instrument reading device accidentally being associated with the wrong pairing module is low. However, first communication module 305 can alternatively comprise any other communication technology known to the skilled person that enables communication between payment instrument reading device 115 and pairing module 300 such that a unique identifier can be transmitted from payment instrument reading device 115 to pairing module 300. For example, first communication module 305 could comprise a Bluetooth® or BLE transceiver, or a barcode scanner configured to read a barcode or QR code located on the base of payment instrument reading device 115. Other variations will become apparent to a skilled person having the benefit of the present disclosure. Preferably the communication technology selected is wireless and more preferably a wireless short-range communication technology, e.g. it operates over the order of millimetres, centimetres, or approximately one to two meters.

Pairing module 300 is communicatively coupled to payment initiating device 105 via a second communication module 310. In the illustrated embodiment second communication module 310 is a wired LAN connection. However, this is not essential and any other communication means known to the skilled person, e.g. WiFi, Bluetooth®, BLE, etc. can instead be used for second communication module 310. Second communication module 310 comprises whatever conventional hardware and/or software is necessary to enable this communication, as will be readily selected by a skilled person.

Pairing module 300 is communicatively coupled to router 110 via a third communication module 315. In the illustrated embodiment third communication module 315 is a wired LAN or wireless WiFi module. However, this is not essential and any other communication means known to the skilled person, e.g. WiFi, Bluetooth®, BLE, etc. can instead be used for third communication module 315. Third communication module 315 comprises whatever conventional hardware and/or software is necessary to enable this communication, as will be readily selected by a skilled person according to the specifics of a given situation.

In the illustrated embodiment both the second communication module and the third communication module make use of the HTTP protocol, or derivatives thereof such as HTTPS. This is the preferred communication protocol, but is not essential as other known communication protocols such as Telnet, FTP, etc. can instead be used.

All of the components shown in FIG. 3a can be controlled by a CPU (not shown) such as a microprocessor that is part of pairing module 300. Pairing module 300 may include other conventional components like memory, a non-volatile storage unit, etc. that may be needed to enable pairing module 300 to carry out the functions described herein. Such conventional components will be readily selected and installed in pairing module 300 by a skilled person having the benefit of the present disclosure.

Optionally, pairing module 300 can also include an inductive charging module (not shown) that is configured to charge payment instrument reading device 115 whilst it is proximate pairing module 300.

The first, second and third communication modules have been described distinctly for ease of understanding. However, it will be appreciated that the functionality of these modules can be provided by a single piece of hardware in pairing module 300.

Figure 4:
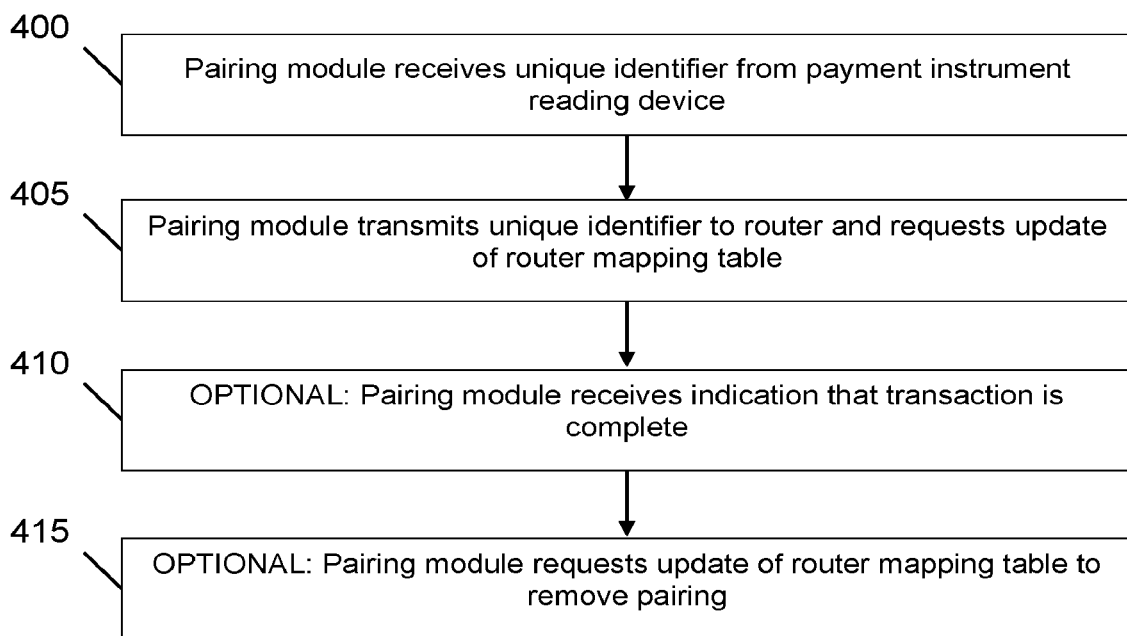

The operation of pairing module 300 is described below in connection with FIG. 4.

In step 400, pairing module 300 receives a unique identifier from a payment instrument reading device like payment instrument reading device 115. In the illustrated embodiment the unique identifier comprises an assigned unique label (e.g. 'DEVICE1'), but any suitable unique identifier can alternatively be used. This unique identifier is the same as the corresponding unique identifier for the payment instrument reading device that is stored in mapping table 210. In the illustrated embodiment the unique identifier is transmitted via RFID, but other communications technologies such as Bluetooth®, BLE, etc. can alternatively be used.

In step 405, pairing module 300 transmits the unique identifier to router 110, e.g. by using third communication module 315. Accompanying the unique identifier is a request for router 110 to update mapping table 210 so that the payment initiating device that pairing module 300 is associated with is paired with the payment instrument reading device that sent a unique identifier in step 400. In the illustrated embodiment this request is a HTTP request or derivatives thereof such as HTTPS, but this is not essential and any other communication protocol known to the skilled person can alternatively be used.

In the illustrated embodiment pairing module 300 is connected to a payment initiating device via second communication module 310. The payment initiating device thus makes all contact with router 110 via pairing module 300. This allows pairing module 300 to act like a proxy server for the payment initiating device. Specifically, pairing module 300 transmits its own unique identifier (e.g. an IP address) to router 110 in place of a unique identifier corresponding to payment initiating device. In the case of an IP address this may be referred to as 'masking', where pairing module 300 masks the IP address of the payment initiating device with its own IP address. When router 110 needs to transmit data to the payment initiating device, it transmits the data to the associated pairing module which in turn forwards the data to the payment initiating device. A simplified example of mapping table 210 under these circumstances is shown in Table 2 below.

Referring to FIG. 3b, if payment instrument reading device 115 communicates with pairing module 300b, then pairing module 300b requests that mapping table 210 is updated to pair itself with payment instrument reading device 115. Mapping table 210 would thus appear as shown below in Table 2. In the interests of clarity of illustration, in Table 2 the unique identifiers are the reference signs shown in the drawings, but it will be understood that in a practical implementation the unique identifiers will be e.g. IP addresses or the like. Here, pairing module 300b acts like a proxy server for payment initiating device 105b, which it is communicatively coupled to.

TABLE 2

| Unique identifier of payment initiating device | Corresponding payment instrument reading device |
| --- | --- |
| 300a | — |
| 300b | 115 |
| 300c | — |

This implementation is preferred because it has the advantage that a pairing module is associated with a payment initiating device simply by connecting the pairing module to the payment initiating device. Here, 'connecting' includes forming a wireless connection between the pairing module and the payment initiating device.

However, in an alternative embodiment, the pairing module does not act as a proxy server for the payment initiating device. In this embodiment in step 405 pairing module 300 additionally transmits a unique identifier to the payment initiating device via communication module 310. This unique identifier is associated with pairing module 300, and could be for example a serial number or other such unique label (e.g. 'LABEL1'). The label is preferably printed in at least a human-readable format at a convenient location on pairing module 300, such as a bottom surface. This pairing module unique identifier is stored in mapping table 210 (see Table 3 below). When the payment initiating device communicates with router 110, it includes the pairing module unique identifier in such communications. In this way router 110 knows which communication module to route such communications to. In the case that the payment initiating device uses HTTP to communicate with router 110, the pairing module unique identifier can be included in the header of each HTTP request. In the case that the payment initiating device includes a web browser application, the browser may be configured to add the pairing module unique identifier to the HTTP header automatically (e.g. by way of a plugin or browser extension).

TABLE 3

| Unique identifier of payment initiating device | Corresponding payment instrument reading device |
| --- | --- |
| LABEL1 | — |
| LABEL2 | 115 |
| LABEL3 | — |

In either case, pairing module 300 may also be configured to carry out optional step 410. In the following paragraphs, for clarity of illustration it is assumed that pairing module 300b is coupled to payment initiating device 105b and that payment instrument reading device 115 is currently in communication with pairing module 300b.

In optional step 410, pairing module 300b receives an indication that a transaction is complete. This indication could be a message that is transmitted from payment processing module 105b, or router 110. Following this, in optional step 415, pairing module 300b requests that router 110 update mapping table 210 such that payment instrument reading device 115 is no longer paired to either pairing module 300b (when pairing module 300b acts as a proxy server) or payment initiating device 105b (when pairing module 300b does not act as a proxy server). Upon receipt of a mapping table update request of this type, router 110 disassociates pairing module 300b from payment instrument reading device 115. Disassociation can involve removal of the unique identifier corresponding to payment instrument reading device 115 from mapping table 210. Advantageously, this allows router 110 to generate a list of payment instrument processing devices that are currently in use in response to a query by determining which payment instrument reading devices do not currently have unique identifiers in mapping table 210. This list may be useful to e.g. a sales assistant looking to identify a counter having a payment instrument reading device that is currently available for use.

Figure 5:
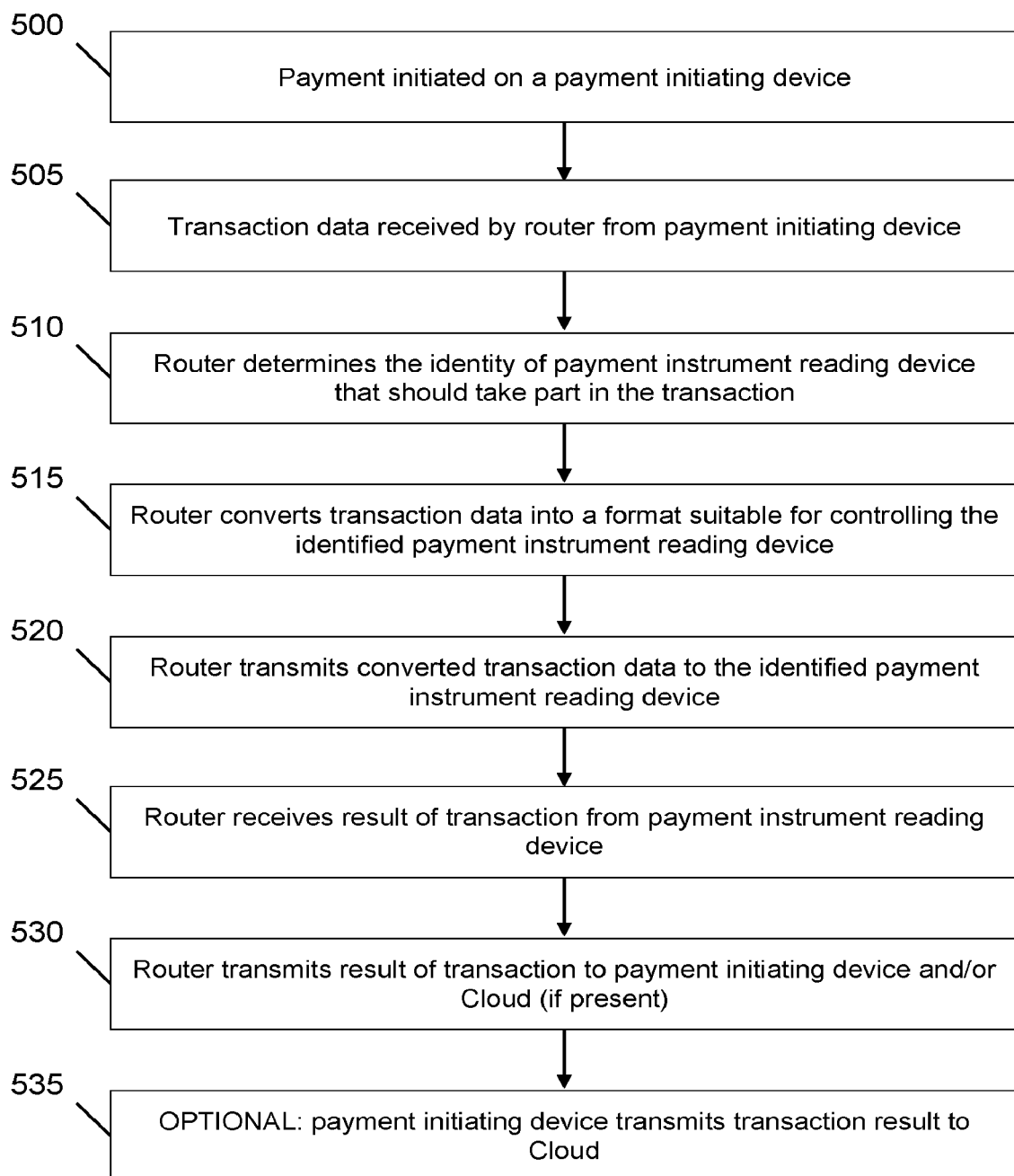
FIG. 5 is a flow diagram showing a mode of operation of the system of FIG. 1.

Referring now to FIG. 5, the operation of system 100 according to the first embodiment is described below.

In step 500, a payment is initiated on payment initiating device 105. If pairing module 300 is present, step 500 also includes carrying out steps 400 and 405 of FIG. 4. Any mechanism by which a user can interact with payment initiating device 105 can be used to initiate the payment, from something as simple as pressing a button to more complex procedures such as filling in and submitting a web form. The mechanism chosen will depend on the nature of payment initiating device 105. Specific examples include:

EXAMPLE 1

Payment initiating device 105 is a button or an equivalent simple user interface mechanism. Payment initiating device 105 is located in, on, or affixed to, a purchasable item. When a user (e.g. a sales assistant or customer) presses the button or otherwise interacts with payment initiating device 105, the payment is initiated. It is preferred in this case that payment initiating device 105 is preconfigured with details relating to the purchasable item, such as the price of the item and/or a mechanism for identifying the item, e.g. a bar code number or other such unique identifier.

EXAMPLE 2

As example 1, except payment initiating device 105 is additionally or alternatively motion sensitive. This can be achieved by providing one or more motion sensors within payment initiating device 105, e.g. accelerometers. When a user (e.g. a sales assistant or customer) moves the purchasable item that payment initiating device 105 is located in, on, or affixed to, this movement is detected by the motion sensor and causes payment initiating device 105 to initiate the payment. As example 1, it is preferred in this case that payment initiating device 105 is preconfigured with details relating to the purchasable item, such as the price of the item and/or a mechanism for identifying the item, e.g. a bar code number or other such unique identifier.

EXAMPLE 3

Payment initiating device 105 is an item of wearable technology or another member of the Internet of things' as is known in the art. User interaction with payment initiating device 105 in some manner as will be readily selected by a skilled person causes initiation of the payment. In this context the user is primarily envisaged to be a customer, but interaction from other parties such as a sales assistant is not precluded. As examples 1 and 2, it is preferred in this case that payment initiating device 105 is preconfigured with details relating to the purchasable item, such as the price of the item and/or a mechanism for identifying the item, e.g. a bar code number or other such unique identifier.

EXAMPLE 4

Payment initiating device 105 is a data processing device that has a display, such as a desktop computer, a laptop computer, a tablet computer, a mobile telephone, a Personal Digital Assistant, etc. Interaction with the user interface of payment initiating device 105, perhaps via a specific application, causes initiation of the payment. In this context the user will likely be either a customer or a sales assistant. Interaction may include scanning a bar code, scanning a QR code, interacting with a RFID antenna, or the like, using payment initiating device 105. Information relating to the purchasable item, such as the price of the item and/or a mechanism for identifying the item, is preferably transmitted to payment initiating device during interaction with the purchasable item.

EXAMPLE 5

Payment initiating device 105 is a data processing device that has a display such as a desktop computer, a laptop computer, a tablet computer, a mobile telephone, a Personal Digital Assistant, etc. The payment initiating device also has a web browser installed on it. The web browser can be any conventional web browser known in the art. Payment initiating device 105 is of this type in the first embodiment and in the first embodiment a payment is initiated by a user by completing and submitting a web form within the web browser. In this context the user will likely be either a customer or a sales assistant. As example 4, payment initiating device 105 may interact with the purchasable item by e.g. scanning a bar code, scanning a QR code, interacting with a RFID antenna, or the like. Information relating to the purchasable item, such as the price of the item and/or a mechanism for identifying the item, is preferably transmitted to payment initiating device during interaction with the purchasable item. Any such information may be used to automatically populate at least some of the fields in the web form within the web browser. The web form may be submitted to a cloud-based application hosted in Cloud 125.

It will be appreciated that the purchasable item in the above examples could include a service, where this service may be physically represented by e.g. a voucher, a keycard, etc. It will also be appreciated that the above examples are not limiting on the scope of the invention and that a skilled person having the benefit of the present disclosure will readily devise additional forms for a payment initiating device and corresponding methods for initiating a payment on the payment initiating device.

Regardless of the form of payment initiating device 105, in step 505 the transaction data is received by router 110 from payment initiating device 105. If pairing module 300 is present and acting as a proxy server, then router 110 receives the transaction data from payment initiating device 105 via pairing module 300. Payment initiating device 105 sends the transaction data using a network communication protocol. The network communication protocol in the first embodiment is Hypertext Transfer Protocol (HTTP) and/or derivatives thereof, e.g. HTTPS, but other currently known or future network protocols suitable for transmitting information over a network (e.g. FTP, Telnet, etc.) may be used instead, as long as the protocol supports transfer of a data file that comprises transaction data. Here, transaction data refers to data relating to the transaction that corresponds to the payment initiated by payment initiating device, including but not limited to any combination of the following: a price of the item(s) being purchased, an identification of the item(s) being purchased (e.g. a bar code number) and a unique identifier corresponding to payment initiating device 105. In the case that payment initiating device 105 includes a web browser, the web browser can be used to generate and send a data package that includes at least the transaction data.

In the case like the first embodiment where payment initiating device 105 uses HTTP or variants thereof to send the transaction data, step 505 may include payment initiating device 105 transmitting a HTTP POST request to router 110. In this case, the payload of the HTTP POST request includes at least the transaction data. The unique identifier corresponding to payment initiating device 105 is preferably the IP address of payment initiating device 105, but other unique identifiers can be used instead.

Following receipt of the transaction data, in step 510 router 110 determines the identity of the payment instrument reading device that should take part in this transaction. Router 110 makes this determination by using mapping table 210 as a lookup table to find the payment initiating device 105 from the received unique identifier and then determine the paired payment instrument reading device. For example, referring to Table 1, in the case that the unique identifier is 'POS1', router 110 refers to mapping table 210 and determines that the paired payment instrument reading device is DEVICE1. If pairing module 300 is present, by this point the operations described in connection with steps 400 and 405 of FIG. 4 will have been carried out, such that mapping table 210 indicates which payment instrument reading device is currently paired with payment initiating device 105.

In step 515, router 110, or more specifically conversion module 215, converts the transaction data from a first protocol to a second protocol that is intelligible to the payment instrument reading device that was identified in step 510. The conversion is carried out based on the received transaction data and also the determined identity of the payment instrument reading device. Specifically, each payment instrument reading device indicates the communication protocol(s) and communication interface(s) that it supports when it is first connected to router 110. For example, this could be via wired LAN communication, WiFi, Bluetooth®, wired RS232 or some other communication. Thereafter, router 110 can use this information to send instructions in an appropriate format such that they can be interpreted and acted upon by the payment instrument reading device. This information could be stored in mapping table 210, if desired, or in some other repository that is accessible to router 110. It will be appreciated that step 515 can be omitted in the event that the transaction data is already in a format that is intelligible to the payment instrument reading device.

The output of conversion module 215 comprises one or more commands and/or instructions, etc. that cause payment instrument reading device 115 to initiate the payment taking process. Conversion between different protocols per se is known in the art and so the configuration and operation of conversion module 215 will be readily understood by a skilled person having the benefit of the present disclosure.

In step 520, router 110 transmits the output of conversion module 215 to payment instrument reading device that was identified in step 510. In the event no conversion was required, then in step 520 the transaction data as received by the router is forwarded on to the payment instrument reading device, possibly without alteration. This may involve communication controller 200 transmitting data via a wired or wireless connection, including but not limited to any of a LAN connection (e.g. via Ethernet cable), a serial connection, a WiFi connection, a Bluetooth® connection and a BLE connection.

Upon receipt of the transaction data or converted transaction data, the relevant payment instrument reading device (i.e. the device identified in step 510) processes the transaction in the manner well known in the art based at least in part on the received transaction data. As is known in the art, the payment instrument reading device generates or receives a transaction result, which typically indicates whether the transaction was approved or declined. Other information may alternatively or additionally be included in the transaction result, according to the requirements of the given situation. Where the transaction result is received from a remote source (e.g. an Acquirer's server), if the payment instrument reading device itself is not IP enabled then the payment instrument reading device may make use of router 110 and its associated network to transmit and receive the necessary data to and from the Acquirer's server. Software may be provided on router 110 to facilitate this exchange of data.

Whatever the nature of the transaction result, in step 525 router 110 receives the transaction result from the payment instrument reading device. It is preferred that the transaction result will be transmitted from the payment instrument reading device to router 110 using the same communication channel as was used in step 520, but this is not essential and implementations in which a different communication channel is used in step 520 compared with step 525 are also possible.

Following this, in step 530 router 110 transmits the transaction result to the payment initiating device that initiated the payment in step 500. In the case that pairing module 300 is present and is acting like a proxy server, router 110 will instead transmit the transaction result to pairing module 300, which will in turn forward the transaction result to the payment initiating device that it is associated with.

Router 110 may make use of mapping table 210 to determine which of a set of payment initiating devices it should send the transaction result to. For example, referring to Table 1, if router 110 receives a transaction result from DEVICE3, it can make use of mapping table 210 to determine that this transaction result should be sent to the payment initiating device having the identification POS3. It will be appreciated that making use of mapping table 210 is not the only way in which router 110 can determine which of a set of payment initiating devices it should send the transaction result to. For example, router 110 may alternatively record the identity of the payment initiating device (or pairing module 300, if present) during step 505 and store this information in a repository, e.g. a local memory, such that this information can be read as part of step 530. The communication link established between the router 110 and the payment initiating device 105 that made the payment request can also or alternatively be used to determine which payment initiating device 105 the transaction result should be sent to. Thus, the payment initiating device 105 can wait for a return message such as an authorisation code or some other indication for a predetermined time via the established communication link.

In implementations like the first embodiment that include Cloud 125, the process of FIG. 3 can optionally include a further step 535 in which payment initiating device 105 transmits the transaction result to Cloud 125. In the first embodiment this is achieved by router 110 transmitting a HTTP 302 Redirect code along with the transaction data to payment initiating device 105, where the Redirect code identifies the appropriate forwarding location in Cloud 125. Payment initiating device 105 then acts on the Redirect code and forwards the transaction result to Cloud 125. In cases like the first embodiment where the payment initiating device includes a web browser, this web browser can be the agent that handles the 302 Redirect forwarding. In the case that a communication protocol other than HTTP is used to communicate between payment initiating device 105 and router 110, an equivalent to the HTTP 302 Redirect code in the respective alternative protocol can be used. A skilled person will readily identify a suitable protocol-specific mechanism given the specifics of a particular implementation.

In some cases it may be preferable for router 110 to alternatively or additionally transmit the transaction result to a different device other than payment initiating device 105. For example router 110 may be configured to transmit the transaction result to a conventional POS terminal that did not take part in the transaction but which is provided in addition to payment initiating device 105. This POS terminal may be configured to forward the transaction result to Cloud 125, if present. This may be preferred where payment initiating device 105 is a relatively unsophisticated device like a wearable or internet enabled button (see Examples 1 to 3 discussed earlier). Mapping table 210 may be configured to store information relating to any of these alternative recipients of the transaction result, so that router 110 is able to determine where the transaction result should be sent. Mapping table 210 may contain information relating to multiple devices against a single entry, so that a single transaction result is transmitted to these multiple devices. Further modifications will become apparent to a skilled person having the benefit of the present disclosure.

It will be appreciated by those of ordinary skill in the art that the process shown in FIG. 5 is such that it will appear to payment instrument reading device 115 that it has been used in a 'normal' manner as known in the prior art, i.e. it will appear to payment instrument reading device 115 that it has received transaction information from a POS terminal and transmitted the result of a transaction back to the POS terminal. Payment instrument reading device 115 therefore does not need to have knowledge of router 110, pairing module 300 (if present), and the operation of the other components of system 100. This advantageously means that any unmodified payment instrument reading device can be used in a system according to the present invention.

It will also be appreciated by those of ordinary skill in the art that advantageously fully customisable pairing of a payment initiating device and a payment instrument reading device is enabled. This is because the pairing between these devices is controlled by the content of mapping table 210. In the event that a particular payment instrument reading device requires replacement, e.g. due to development of a fault, this can be achieved seamlessly by simply updating the information in mapping table 210 (e.g. by sending a training request) to pair the replacement payment instrument reading device with the appropriate payment initiating device. In cases where there are a different number of payment instrument reading devices to payment initiating devices, and particularly fewer payment instrument reading devices than payment initiating devices, the payment instrument reading devices can be moved between the payment initiating devices without difficulty. This flexibility of operation is not offered by prior art systems.

Additionally, in operation, transaction information is passed automatically from a payment initiating device to a payment instrument reading device. This removes the need to rekey information into a payment instrument reading device as is present in the prior art, avoiding delays and errors. This is achieved without having to directly connect the payment instrument reading device to the payment initiating device, advantageously allowing the payment initiating device to be a COTS device (e.g. a desktop computer) that does not require any special configuration to be able to take payments. Further, the payment initiating device can be a thin client device because the payment taking application can be hosted remotely (e.g. in Cloud 125) without compromising the ability to control the payment instrument reading device. This advantageously means that changes to the payment taking application, e.g. upgrades, need only take place once in Cloud 125 because changes at the Cloud automatically propagate to each thin client payment initiating device. The benefits of this saving of time and effort are realised by all organisations but can perhaps most easily be seen in larger organisations that could have many tens, hundreds or even thousands of payment initiating devices distributed over a large geographical area.

Embodiments that make use of pairing module 300 also allow dynamic pairings that last only for the duration of a transaction such that a single payment instrument reading device can be shared between a plurality of payment initiating devices. This enables the creation of a 'pool' of payment instrument reading devices that can be freely used with any payment initiating devices. This is particularly advantageous in situations where there are more payment initiating devices than payment instrument reading devices. In this situation in the prior art, a customer wishing to carry out an electronic payment would have to wait until a payment initiating device having an associated payment instrument reading device becomes free. Embodiments of the present invention can solve this problem because any currently unused payment instrument reading device can be used to take the electronic payment with any currently unused payment initiating device, allowing more flexible allocation of electronic payment resources.

Figure 6:
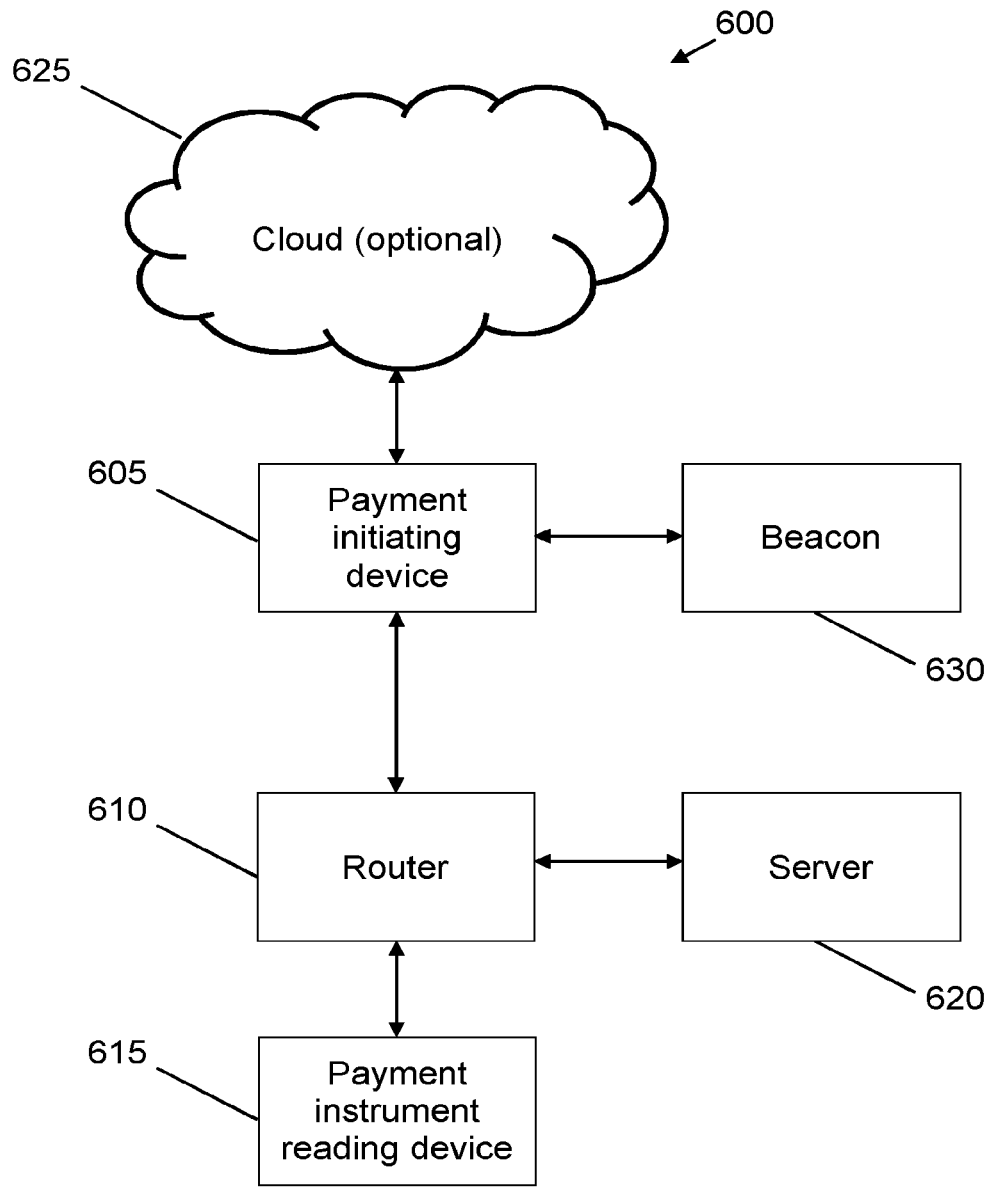
FIG. 6 is a schematic diagram of a system for handing electronic payments according to a second embodiment.

FIG. 6 shows a schematic diagram of a system 600 according to a second embodiment. System 600 has a number of similarities with system 100 and description of components of system 100 applies equally to like components of system 600 unless explicitly stated otherwise. System 600 includes a payment initiating device 605, a router 610, a payment instrument reading device 615, a server 620 and optionally a connection to a Cloud 625. System 600 also includes a beacon 630. As shown, payment initiating device 605 is communicatively coupled to router 110 and optionally also communicatively coupled to Cloud 625. Payment initiating device 605 is also communicatively coupleable to beacon 630, and preferably this coupling is transient and enabled only at short range, e.g. distances of the order of millimetres, centimetres, and/or approximately one meter. The coupling between payment initiating device 605 and beacon 630 is discussed in further detail later in this specification.

Router 610 is communicatively coupled to payment instrument reading device 615 and optionally communicatively coupled to server 620. Router 610, payment instrument reading device 615 and server 620 are the same as their counterparts in system 100 and so description of these components of system 600 is not repeated here. In the second embodiment, the mapping table of router 610 preferably stores only dynamic pairings.

It will be appreciated that system 600 is not restricted to a single payment initiating device and a single payment instrument reading device, and that system 600 may include any number of payment initiating devices like payment initiating device 605 and any number of payment instrument reading devices like payment instrument reading device 615. There can also be any number of beacons like beacon 630 in system 600. System 600 can include the same number of payment initiating devices as payment instrument reading devices, or there can be more payment initiating devices than payment instrument reading devices. It is also possible to have more payment instrument reading devices than payment initiating devices, and this may be particularly suitable in a large retail environment (e.g. a department store) where it is undesirable for a customer to have to walk a significant distance in order to make an electronic payment.

System 600 is preferably used in implementations in which the payment initiating devices are mobile within the premises in which they are deployed (e.g. merchant premises) and the payment instrument reading devices are either in a fixed location or are also mobile within the premises.

Payment initiating device 605 has some similarities to payment initiating device 105 and so description of the similar aspects of payment initiating device 605 is not repeated here. Payment initiating device 605 is a mobile device, such as a laptop computer, a tablet computer, a mobile telephone or a Personal Digital Assistant. Here a 'mobile device' is defined as any device that can be moved freely around a premises, i.e. a portable device. Advantageously, payment initiating device 605 is a COTS device and can even be a device owned by a customer, e.g. a customer tablet or mobile telephone.

Payment initiating device 605 includes a display that enables a user (e.g. a sales assistant or customer) to interact with a payment processing application that facilitates the taking of electronic payments. In the second embodiment the payment processing application is hosted on optional Cloud 625, and is accessed via a conventional web browser that is installed on payment initiating device 605 making use of the HTTP protocol or derivatives thereof (e.g. HTTPS). Alternative communication channels other than an HTTP channel that are known to a skilled person can alternatively be used to enable payment initiating device 605 to access and interact with the payment processing application. It will be appreciated by a skilled person that hosting the payment processing application on Cloud 625 provides the triple advantages of 1) allowing payment initiating device 605 to be a COTS device and possibly even a customer-owned device; 2) allowing payment initiating device 605 to be a thin client device; and 3) allowing updating of the payment processing application to be centrally controlled, reducing the time and effort involved in deploying a software update.

Nevertheless, alternative embodiments are possible where Cloud 625 is omitted and the payment processing application is installed locally on and executed by payment initiating device 605.

In the second embodiment, payment initiating device 605 has a locationing application installed on it. The locationing application is configured to control payment initiating device 605 to detect signals from beacon 630. This is described in further detail later in connection with FIGS. 7 and 8. The locationing application is installed on payment initiating device 605 before making any electronic payments. In the case that payment initiating device 605 is a merchant device, the merchant installs the locationing application on payment initiating device 605 as part of the setup process of system 600. In the case that payment initiating device 605 is a customer device, the customer downloads and installs the locationing application to their device before using it to make an electronic payment. Preferably in this case the locationing application is generic, i.e. not associated with any one particular outlet or set of outlets, so that the customer can make electronic payments at any supported outlet using a single locationing application.

In all cases the locationing application is of a type that is supported by all major operating systems, including but not limited to Microsoft® Windows®, OS X®, Android®, iOS®, UNIX®, etc. A different version of the locationing application may be developed for each supported platform as is known in the art. This advantageously enables a large range of COTS devices to install and execute the locationing application without modification or configuration.

As mentioned above, system 600 also includes a beacon 630. Beacon 630 includes a transmitter that is configured to broadcast a signal that can be used by payment initiating device 605 to determine its current location in a premises. The signal broadcast by each beacon in system 600 is unique to that beacon, such that it is possible to tell which beacon a given signal originated from. The relative signal strength of a number of beacons can then be used by payment initiating device 605 to determine its current location. Each beacon can be uniquely identified by configuring each beacon to broadcast a unique identifier such as a WiFi or Bluetooth Service Set Identifier (SSID), or beacon advertised IDs provided according to other protocols such as Eddystone, Apple iBeacon, or in accordance with the AltBeacon standards. Alternatively, a fundamental property of the signal such as the frequency of the signal can be unique to each beacon, and payment initiating device 605 can distinguish each beacon on this basis. Payment initiating device 605 can use the relative signal strengths of surrounding beacons like beacon 630 to determine which of a set of available payment instrument reading devices it should pair with. For example, payment initiating device 605 may pair with the closest payment instrument reading device, i.e. the one associated with the strongest beacon signal. The payment initiating device can cross-reference signal strength information with a map of the premises to determine which of a set of available payment instrument reading devices it should pair with.

In the second embodiment beacon 630 includes a Bluetooth® transmitter, and preferably a Bluetooth Low Energy® (BLE) transmitter. It will be appreciated that other wireless communication technologies can be used instead of Bluetooth®, e.g. a ZigBee® connection, RFID/NFC communications technology, and the like.

The region surrounding a beacon is referred to herein as a 'payment zone'. In a typical deployment a plurality of beacons like beacon 630 will be disposed around a premises, such that a plurality of payment zones are provided. Arrangements in which only one beacon and one corresponding payment zone are provided are also within the scope of the present invention. Single beacon arrangements may be preferred in smaller premises. Mobile beacons that are moveable within premises P, as shown in FIG. 7, may also be provided.

The boundary of a payment zone can be defined as the location at which the signal from a particular beacon is greater than or equal to a predetermined threshold level. The threshold level can be the detection threshold below which the signal cannot be reliably detected by a receiver, or it can be set at a level higher than this. Averaging can be used to smooth instantaneous fluctuations in signal strength.

Figure 7:
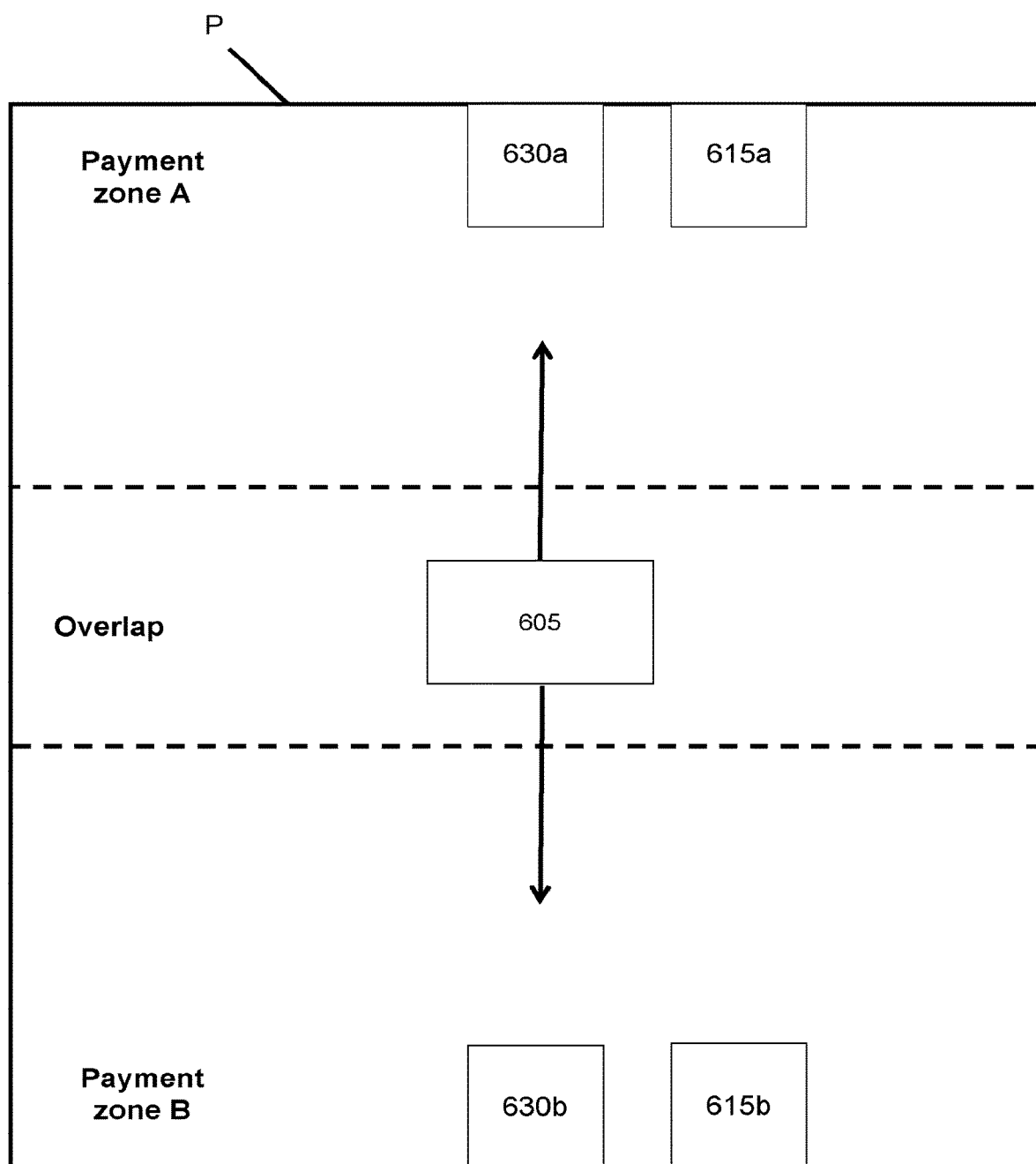
FIG. 7 is a schematic diagram showing an exemplary deployment of the system of FIG. 6.

A simplified example of deployment of two beacons in a premises P is shown in FIG. 7, in which two payment zones A and B are provided at opposing ends of a premises P. Payment zone A is associated with a first beacon 630a and payment zone B is associated with a second beacon 630b. In the middle of premises P is a region marked 'overlap' in FIG. 7, within which the signal from both beacons 630a and 630b is of a detectable strength. As shown, payment initiating device 605 is freely movable within premises P.

Each payment zone has an associated payment instrument reading device like payment instrument reading device 615. In the example of FIG. 7, payment zone A has an associated payment instrument reading device 615a and payment zone B has an associated payment instrument reading device 615b. It is also possible to have more than one payment instrument reading device associated with a single payment zone, if desired.

In use, payment initiating device 605 can determine where it is currently located in premises P by examining the strength of the signal(s) from the various beacons that it can currently detect. Any suitable technique can be used to determine the location of payment initiating device 605. For example, at the most basic, it can be determined which of a set of signals is the strongest and on that basis the payment zone that the payment initiating device is currently closest to can be determined. Other techniques for using signal strength to determine location, e.g. multilateration or other such signal triangulation techniques, can be used instead. These techniques are well known in the art and hence are not described in detail here.

The location of the payment initiating device can be used to determine which payment instrument reading device should take part in a transaction with the payment initiating device, as described later in this specification.

It will be appreciated that in an ideal deployment it is possible to detect a signal from at least one beacon regardless of location within premises P, i.e. there are no signal black spots. This allows the location of payment initiating device 605 to be determined regardless of where it is in premises P. However, in practice this may be difficult to achieve due to objects such as walls that attenuate electromagnetic waves, or due to other constraints such as cost. Therefore, a layout in which only a fraction of the premises is covered by signal from at least one beacon is also contemplated. In some cases it may even be preferable to deliberately avoid providing signal from a beacon in some areas of the premises. The optimum layout of a set of beacons, as well as the number of beacons, will be specific to the premises at which system 600 is deployed and therefore a virtually infinite number of modifications of the arrangement shown in FIG. 7 are possible. A skilled person having the benefit of the present disclosure will readily be able to select a suitable number and location of beacons given details of a specific premises.

In the second embodiment the location of each beacon can either be fixed or mobile. A fixed beacon can be secured to a permanent structure within premises P such as a wall, for example. These beacons define fixed location payment zones and can be used by payment initiating device 605 to determine its current location. At least some beacons may be mobile beacons that are moveable around premises P. This can be achieved by giving a beacon to a member of staff (hereafter 'beacon carrier') so that the member of staff carries the beacon on their person as they move around the premises. This arrangement may be particularly suited to a restaurant-type arrangement where table service is provided, as each waiter or waitress can carry a beacon on their person. In this case the payment instrument reading device that is associated with the beacon may also be mobile; in the above restaurant-type example, a mobile payment instrument reading device could be carried by the waiter or waitress. The beacon could even be integrated with the payment instrument reading device, such that the two entities are physically inseparable, or the payment instrument reading device could itself be the beacon. However, this is not essential and fixed payment instrument reading devices can instead be used. As a further alternative, the beacon can be integrated with the payment initiation device itself, or integrated with a separate POS terminal; typically a COTS device will have the necessary hardware and software installed already, such that the present invention can advantageously be implemented by an unmodified COTS device.

Preferably, in the case that the beacon is mobile, at least one stationary beacon is also provided in premises P. The at least one stationary beacon is used by the locationing application to determine the current location of payment initiating device 605 in premises P as discussed below. In this case the mobile beacon may be used to allow the payment initiating device to determine when to initiate a payment, as the mobile beacon can be used as an indicator that the payment instrument reading device as carried by a beacon carrier is now proximate the payment initiating device. This is discussed in more detail below.

Figure 8:
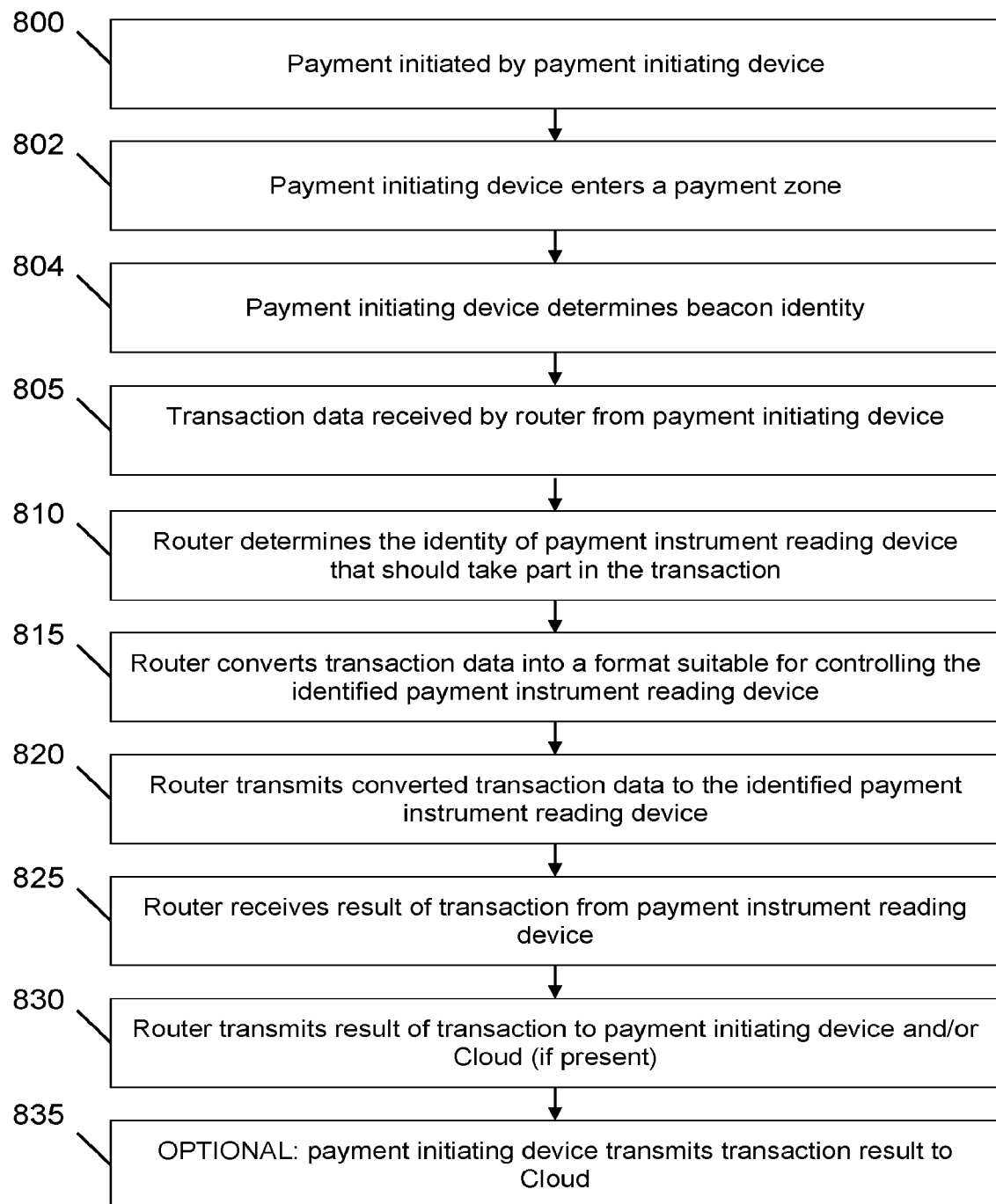
FIG. 8 is a flow diagram showing a mode of operation of the system of FIG. 6.

Referring now to FIG. 8, the operation of system 600 according to the second embodiment is described below.

In step 800, a payment is initiated on payment initiating device 605 by generating a transaction request. Any mechanism by which a user can interact with payment initiating device 605 can be used to initiate the payment, from something as simple as pressing a button to more complex procedures such as filling in and submitting a web form. In the specific example of the second embodiment the user completes a web form within a conventional web browsing application that is installed on payment initiating device 605. The web form is submitted to a payment processing application that is preferably hosted in Cloud 625. Preferably, HTTP or a derivative thereof such as HTTPS is used to handle the web form submission. In this case the submitted web form constitutes the transaction request. It will be appreciated that variants of this are possible and that such variants are also within the scope of the present invention.

In step 802, payment initiating device 605 enters a payment zone, e.g. payment zone A of FIG. 7. This is achieved by the user (e.g. a sales assistant or customer) transporting payment initiating device 605 into the payment zone. An indication that the payment initiating device 605 has entered a payment zone may be provided; e.g. a message may appear on the display of payment initiating device 605 notifying the user that the payment zone has been entered. If payment initiating device 605 is already within an available payment zone, no movement is necessary and the user may be informed of this via any suitable mechanism such as a message on the display. The payment zones may advantageously correspond to the position of fixtures within the premises, e.g. in a restaurant-type setting the payment zones are advantageously located according to factors such as the table layout, the position of a bar and/or the location of the exit.

Optionally, in step 802 payment initiating device 605 can provide feedback to the user in order to direct the user to a particular payment zone. This feedback can be in the form of a list of payment zones having associated payment instrument reading devices that are currently not in use, for example, or it may be provided by a 'virtual shopping assistant' or 'avatar' which is an electronic assistant designed to interact with humans in a human-like manner. The latter case is preferred in cases where human shopping assistants are not available such that the user is a customer, and particularly in cases where the customer is using a portable electronic device (e.g. a smartphone) to assist with the shopping process. Such assistance could be, for example, using the portable electronic device to scan product barcodes or read NFC product tags. A map or an equivalent set of instructions can be provided as part of the feedback to direct the user to an unoccupied payment zone based on their current location in the premises. Here 'unoccupied' indicates that the payment instrument reading device associated with the payment zone is not in use, such that it is ready to take an electronic payment. A message may be displayed to the user by payment initiating device 605, such as 'Please proceed to payment zone A'. Preferably, the user is directed to the nearest unoccupied payment zone. Optionally, each payment zone can be marked in premises P in a way that is readily identified by the user; for example, a sign may be provided in the premises P, where the sign is located proximate the payment zone's payment instrument reading device.

Payment initiating device 605 may determine the optimal payment zone based on current location. For example, the payment zone that is closest to the current location of payment initiating device 605 may be preferentially chosen. Other factors such as payment zone usage information may alternatively or additionally be used. For example, for conventional checkouts where items are scanned, a queue depth can be estimated based on a mathematical relationship proportional to the number of items that have been sold through a payment and inversely proportional to the length of time between payment transaction for a given zone. For checkouts that exclusively use payment initiating devices like payment initiating device 605 the queue depth can be calculated by the number of payment initiating device that are in a wait state in each payment zone. The queue order can be maintained by the payment initiating devices collectively.

The location of payment initiating device 605 can be determined by the locationing application that is installed on payment initiating device 605. Specifically, the locationing application can determine the current location of payment initiating device 605 in premises P using known locationing techniques, e.g. multilateration or triangulation techniques etc., based on the beacon signal(s) that the payment initiating device can detect from its current position. The locationing application can transmit the current location of the payment initiating device to router 605, perhaps as part of the transaction request. The occupancy status of each payment instrument processing device can be determined by using the mapping table associated with router 610, as discussed below in connection with step 815. Router 610 or another data processing device that is part of system 600 (not shown) can be configured to analyse current demand for payment instrument reading devices and to direct the user to a payment zone that is unoccupied and also relatively close to their current location. Any suitable queue management algorithm that is known to the skilled person can be used to allocate users to payment zones. In the case that all payment zones are currently occupied, the user may be placed on a waiting list and informed when a payment instrument reading device becomes available for their use.

It will be appreciated that the order of steps 800 and 802 can be reversed so that a payment initiating device is associated with a payment zone before it initiates a payment. In this case the payment initiating device would request to be brought into a payment zone before the user is able to initiate the payment.

In step 804, payment initiating device 605 determines the identity of the beacon associated with the payment zone that it is currently located in. In the second embodiment this is achieved by reading the SSID associated with the beacon. For example, referring briefly to FIG. 7, payment initiating device 605 can read the SSID Payment_Zone_A that is associated with beacon 630a when it is in payment zone A. Other mechanisms by which the identity of a beacon can be determined by payment initiating device 605a that are known to a skilled person can alternatively be used; for example, any of the aforementioned Eddystone, Apple iBeacon and AltBeacon standards could alternatively be used in place of an SSID to identify a beacon, or other unique identifiers such as a media access controller (MAC) address or IP address could be used. The present invention can also make use of any future standards that are defined and which are suitable for uniquely identifying a beacon. Preferably the locationing application that is installed on payment initiating device 605 determines the beacon identity and receives information representative of the location of the beacon from the beacon.

In terms of queue management, the beacon associated with the payment zone within which the payment initiating device 605 is located can cause useful information to be provided to the locationing application of the payment initiating device, such as where the payment initiating device is in a queue. A number of payment initiating devices may be within a particular payment zone served by a beacon and the locationing application on a particular payment initiating device that is in a queue can determine the time to wait intelligently based on, for example, number of items in the virtual shopping basket of payment initiating devices that are ahead of the particular payment initiating device in the queue. With this information, other queues can be chosen. The payment initiating device in combination with the locating application can provide a virtual shopping basket. It can detect other payment initiating devices and share information between payment initiating devices forming an ad hoc network of payment initiating devices all communicatively coupled via the router 610.

In the case where at least one beacon is mobile, step 804 can also include directing a beacon carrier (e.g. a member of staff) to the current location of the payment initiating device. In this case the beacon carrier may also bring a mobile payment instrument reading device along with the beacon, where the selected payment instrument reading device is paired with the either the payment zone or the beacon carried by the beacon carrier. This latter case allows multiple payment instrument reading devices to serve a single payment zone, because in that case payment initiating device 605 detects the mobile beacon associated with a particular payment instrument reading device as it approaches and transmits the mobile beacon's unique identifier and/or the payment instrument reading device's unique identifier to router 610 as part of the transaction data. In the case of mobile beacons, router 610 thus identifies which payment instrument reading device is involved with a transaction based on the detection of a mobile beacon carried by the beacon carrier as opposed to the fixed location beacon(s) that identify the payment zone.

In the mobile beacon case, user profile information may be provided in order to assist the beacon carrier in finding the user of the payment initiating device. The user profile information can include a picture of the user and/or details relating to the user that will assist the beacon carrier in finding the user, e.g. gender and the like. Other information that may be useful to the beacon carrier can also be provided, such as the user's preferred language of communication, a list of the item(s) that the user wishes to purchase and/or information relating to any previous history that the establishment may have with the user such as a credit rating.

The beacon carrier may also bring the item(s) that the user wishes to purchase along with the beacon, such that the user receives the item(s) simultaneously with making the electronic payment. In this case payment initiating device 605 includes a facility for allowing the user to place an order.

For example, the web browser installed on payment initiating device 605 could communicate with the locationing application also installed on payment initiating device 605 and indicates that a payment needs to be made. This can be achieved by the browser transmitting a HTTP Loopback request of the type known in the art to the locationing application. This request has appropriate transaction data appended to it, such as the amount of the transaction and/or the identity of the item(s) that the user wishes to purchase. The locationing application receives this request, appends unique identifier corresponding to the beacon associated with the payment zone that the payment initiating device is currently located in (as determined in step 804) and transmits this back to the browser as an HTTP 302 redirect request.

This is particularly suited to a bar-type situation where the user is purchasing an item that is consumed on site, such as a drink and/or food. In this case the item(s) may have been purchased by the user using the payment initiating device, by e.g. using a web browser to browse the web site of the establishment that the user is currently located in. Preferably in such cases the payment initiating device is owned and operated by the user (i.e. customer), where here 'owned' indicates that the user themselves provided it as opposed to a merchant provided device. The user may configure their payment initiating device for use by downloading a software application that is configured to provide the necessary functionality.

Once the beacon identity has been determined, in step 805 router 610 receives transaction data from payment initiating device 605. This step has similarities with step 505 of the first embodiment in the case that pairing module 300 is not present. However, in the second embodiment, the unique identifier that is transmitted with the transaction data corresponds to either the identity of the beacon associated with the payment zone that the payment initiating device is currently located in or the unique identifier associated with the beacon carried by the beacon carrier. In the example set out earlier, the transaction data would therefore include the unique identifier Payment_Zone_A. Alternatively, for the embodiment where a mobile beacon is associated with a particular payment instrument reading device (for example, attached to the payment instrument reading device), the identifier may only include identification information relating to the associated payment instrument reading device.

The transaction data can be transmitted by payment initiating device 605 as soon as it has determined the beacon identity. Alternatively, the user may be prompted by payment initiating device 605 to indicate when transmission of the transaction data should occur. The prompt can be in any form known to a skilled person, such as a message on the display of payment initiating device 605.

As a further alternative, payment initiating device 605 can periodically determine the strength of the beacon corresponding to the payment zone that it was associated with in step 802 to determine when it is appropriate to initiate the transaction by transmitting the transaction data to router 610. Where the payment instrument reading device is mobile, the beacon associated with the beacon carrier can be used to determine when the payment instrument reading device has arrived proximate the current location of the payment initiating device and this can be used as the trigger to transmit the transaction data to router 610. It will be understood that as the distance between the payment initiating device and a beacon decreases, the amplitude of the signal from that beacon as measured by the payment initiating device increases. The threshold level can therefore be set to correspond to an expected signal strength that indicates that the distance between the beacon and payment initiating device is relatively small, e.g. of the order of centimetres, one meter, or a few meters. This distance will vary according to the specifics of the environment and a skilled person having the benefit of the present disclosure and details of the environment will be able to select an appropriate threshold value. Detection of a signal strength that is greater than or equal to the threshold value can be used as the trigger to cause the payment initiating device to initiate transmission of the transaction data to router 610. It will be appreciated that, if payment initiating device 605 is already in a payment zone at the time a payment is initiated, the threshold condition may be immediately satisfied such that there is no delay in transmission of the transaction data to router 610.

In the second embodiment the transaction data is transmitted by payment initiating device 605 using the HTTP protocol or a derivative thereof, e.g. HTTPS. In particular, in the second embodiment the locationing application sends an HTTP request to router 610 including the transaction data and the unique identifier corresponding to the beacon identified in step 804. This is however merely one possible example and other methods for appending the beacon's unique identifier to the transaction data and transmitting this information to router 610 can alternatively be used. For example, a data transmission protocol other than HTTP that is known to the skilled person can be used instead of HTTP.

Upon receipt of the transaction data, in step 810 router 610 determines the identity of the payment instrument reading device that should be involved in this particular transaction. Where the unique identifier is of the beacon, router 610 makes this determination using a mapping table to determine the corresponding payment instrument reading device. Unlike mapping table 210 of the first embodiment, the mapping table of the second embodiment may contain unique identifiers corresponding to beacons rather than payment initiating devices. An example is shown in Table 4 below.

TABLE 4

| Unique identifier of beacon (e.g. SSID) | Corresponding payment instrument reading device |
|---|---|
| Payment_Zone_A | DEVICE1 |
| Payment_Zone_B | DEVICE2 |
| Payment_Zone_C | DEVICE3 |

In this embodiment the mapping table can also define the pairing between a beacon and a payment instrument reading device. For example, if router 610 receives an incoming communication that includes the unique identifier Payment Zone A, it performs a lookup in the mapping table to determine that DEVICE1 is the payment instrument reading device that is paired with the beacon corresponding to payment zone A. Subsequent operations of router 610 in connection with this particular request are therefore directed to payment instrument reading device DEVICE1. In the second embodiment the incoming requests from the payment initiating device are HTTP requests, but the invention is not limited in this manner and other communications protocols can instead be used.

In another embodiment, where the unique identifier received by the router 610 is of the payment instrument reading device, the identity of the beacon may not be needed.

In either case (where the unique identifier is of the beacon or of the payment instrument reading device), the mapping table may include information relating to the communication mechanism to communicate with each payment instrument reading device. For example, this could be a wired connection, Bluetooth, WiFi or some other communication mechanism.

Optionally, the mapping table can include other information such as a unique identifier (e.g. IP address) corresponding to the identity of the payment initiating device that transmitted a transaction request to router 610. This information may be used to route the result of the transaction back to the appropriate payment initiating device. Any other data deemed useful by a skilled person can alternatively or additionally be stored in the mapping table associated with router 610.

The mapping table associated with router 610 is preferably populated using the methods discussed above in respect of the first embodiment under the heading 'case 1: static pairings'. It will be understood that, in the second embodiment, the static pairings can also be between beacon unique identifiers and payment instrument reading devices.

Optionally, step 810 can also include recording an identification that the payment instrument reading device that was identified in the lookup operation involving the mapping table is currently in use. This can be achieved, for example, by setting an IN_USE flag to TRUE against the entry in the mapping table that corresponds to that specific payment instrument reading device. Many other mechanisms for indicating that a payment instrument reading device is currently in use will become apparent to a skilled person having the benefit of the present disclosure. It will be appreciated that identifications of this type can be used by any component of system 600 to determine whether a payment zone is busy, and that this information can be provided to a queue management algorithm.

Following identification of the payment instrument reading device, the process proceeds in the same manner as the first embodiment. Specifically, steps 815 to 835 of the second embodiment correspond to steps 515 to 535 of the first embodiment, respectively. In the interests of economy of presentation, steps 815 to 835 are therefore not described in detail here. Optionally, in the second embodiment step 830 or 835 can include transmitting the transaction result to the locationing application that is installed on the payment initiating device.

Figure 9:
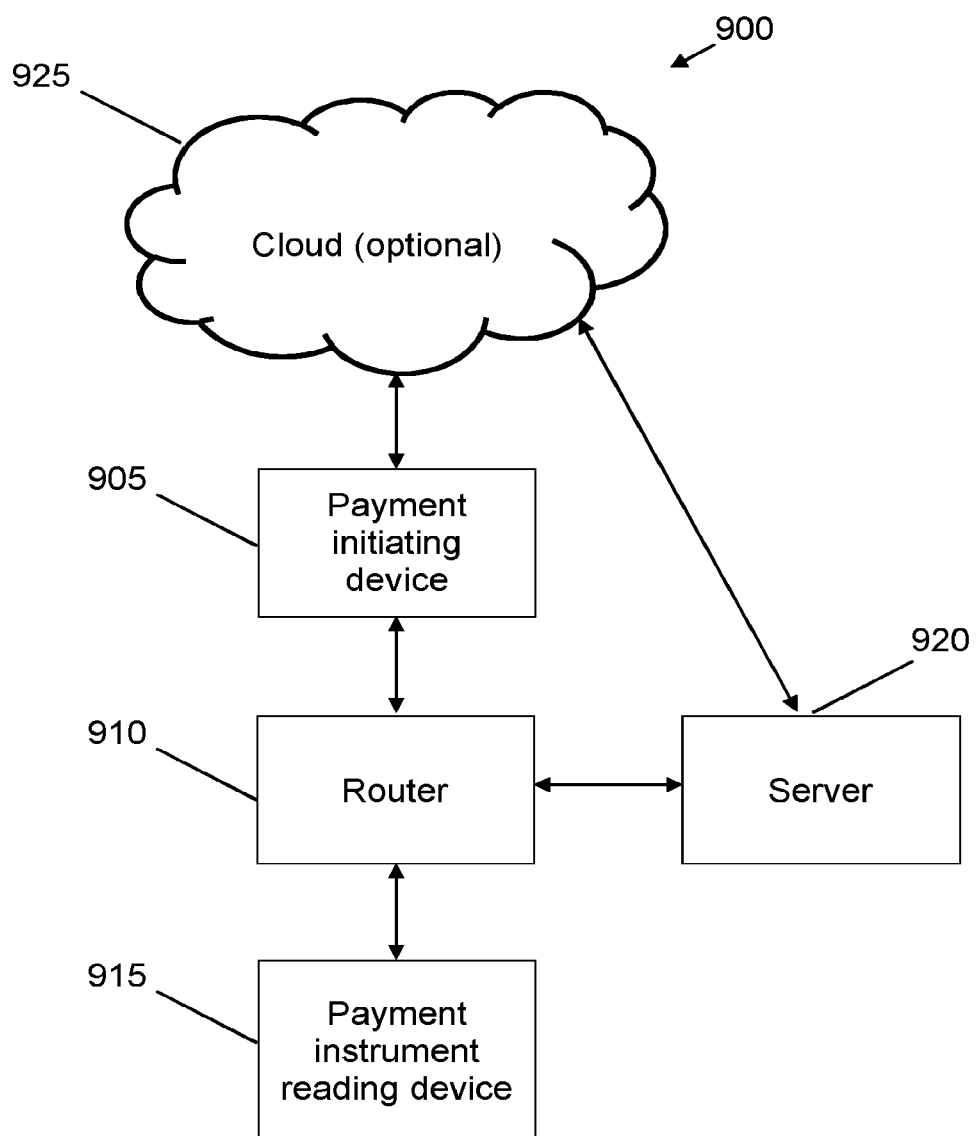
FIG. 9 is a schematic diagram of a system for handing electronic payments according to a third embodiment.

FIG. 9 shows a schematic diagram of a system 900 according to a third embodiment. System 900 is the same as system 100 in terms of constituent parts and so in the interests of conciseness a repeat description of system 900 is not provided here. The components of system 900 are the same as their counterparts in system 100 except where explicitly indicated below.

System 900 includes a payment initiating device 905, a router 910, a payment instrument reading device 915, optionally a server 920 and optionally a connection to a Cloud 925. As shown, payment initiating device 105 is communicatively coupled to router 910 and optionally also communicatively coupled to Cloud 925. Router 910 is communicatively coupled to payment instrument reading device 915 and optionally communicatively coupled to server 920. Server 920 is optionally communicatively coupled to Cloud 925, if present.

Payment initiating device 905 has a software application installed on it, where this software application manages the association of the payment initiating device with a payment instrument reading device. This application will hereafter be referred to as a 'pairing application'. Payment initiating device 905 also has a conventional web browser installed on it. In the third embodiment, payment initiating device 905 is any of a desktop computer, a laptop computer, a tablet computer, a mobile telephone and a Personal Digital Assistant. Other similar devices not explicitly mentioned here but known to the skilled person can alternatively be used for payment initiating device 905.

Payment initiating device 905 and payment instrument reading device 915 are both configured to enable wireless short range data communication between them. In the third embodiment both payment initiating device 905 and payment instrument reading device 915 are configured for RFID communication, possibly using NFC protocols. Preferably a passive RFID arrangement is used, where payment initiating device 905 includes an RFID antenna and payment instrument reading device 915 includes the passive RFID element (e.g. a RFID tag). Existing payment instrument reading devices that do not support RFID communication, and specifically RFID transmission, can be upgraded by affixing a RFID-enabled sticker or the like to their outer surface to act as a passive RFID tag. Thus, backwards-compatibility is ensured.

It will be appreciated that other wireless short range data communication technologies known to the skilled person can be used in place of RFID to enable short range communication between payment initiating device 905 and payment instrument reading device 915. For example, a barcode or QR code could be affixed to payment instrument reading device 915 and a camera for reading the barcode or QR code could be included as part of payment initiating device 915.

The operation of system 900 is shown in FIG. 10. The operation of system 900 is similar to the operation of system 100. The only differences in operation are that system 900 includes the additional step 1000a, described immediately below, and that steps 1000 and 1005 are modified as described below. Steps 1010 to 1035 are the same as their corresponding steps 110 to 135 as described in respect of system 100.

In step 1000a, payment initiating device 905 is associated with payment instrument reading device 915. The association process is initiated by bringing payment initiating device 905 and payment instrument reading device 915 close to one another, such that they can communicate using a short range wireless data communication channel. In the third embodiment in which each of these devices is RFID enabled, step 1000a involves bringing payment initiating device 905 and payment instrument reading device 915 into RFID communication range of one another. An indication of whether payment initiating device 905 and payment instrument reading device 915 are currently close enough to carry out a transaction may be provided to a user, e.g. on a display screen of one or both of these devices. This indication may be provided based on known methods and protocols to calculate distance. For example, any of: wireless signal strength (of Wifi, Bluetooth or other such wireless protocols), radar, LIDAR, magnetic field detection, ultrasound distance determination, infrared distance determination and proximity light sensors may be used to estimate the distance currently separating payment instrument reading device 915 and payment initiating device 905 to allow a corresponding indication to be provided to a user.

The precise distance required to achieve communication between payment instrument reading device 915 and payment initiating device 905 will depend on the specifics of a given implementation, but it is expected to be of the order of one meter or less, and perhaps only a few centimetres, or even contact between the two devices; i.e. zero separation distance. Other distances are however not precluded.

Once the distance between payment initiating device 905 and payment instrument reading device 915 is sufficiently small to allow communication, payment initiating device 905 receives data from payment instrument reading device 915. The received data includes a unique identifier that identifies payment instrument reading device 915. The unique identifier can be freely chosen by the skilled person according to the specifics of a given implementation. In the third embodiment, the unique identifier is a unique label such as 'LABEL1'. The unique identifier is preferably stored by payment initiating device 905 in a storage module (e.g. a local repository like a memory, or a remote storage device) until the initiation of a transaction, at which point this information is forwarded to router 110 as part of the transaction process to inform router 110 which payment instrument reading device it should use for this transaction.

In the third embodiment the process of receiving the unique identifier from payment instrument reading device 915 is handled by the pairing application that is installed on payment initiating device 905. The pairing application is configured to control a data reading component of payment initiating device 905, which in the third embodiment is a RFID antenna. The data reading component receives the unique identifier from a corresponding data providing component that is part of payment instrument reading device 915. In the third embodiment, the data providing component is a RFID tag, preferably a passive RFID tag. Other data encoding and transmission methods could also be used, such as: QR code to camera, sound modulation to microphone, light encoding to camera, infrared data transmission as used in remote controls, etc.

Pairing application is also configured to transmit the unique identifier that it received from payment instrument reading device 915 to router 910. Router 910 uses the received identifier to update its mapping table, in a manner similar to steps 400 and 405 of FIG. 4. The end result is that the mapping table of router 910 records that a dynamic pairing has been formed between payment initiating device 905 and payment instrument reading device 915.

In step 1000, a payment is initiated on payment initiating device 905. In the third embodiment, initiating the payment includes causing the web browser that is installed on payment initiating device 905 to make an HTTP loopback call to the pairing application that is installed on payment initiating device 905. The loopback call includes the transaction data generated by the ongoing transaction; here, transaction data refers to data relating to the transaction that corresponds to the payment initiated by payment initiating device, including but not limited to any combination of the following: a price of the item(s) being purchased and/or an identification of the item(s) being purchased (e.g. a bar code number). The invention is however not limited in this respect and any other mechanism known to the skilled person for getting transaction data from the web browser to the pairing application can instead by used. It will be appreciated that a HTTP loopback call is just one mechanism for getting the transaction data from the web browser to the pairing application, and that other suitable mechanisms such as an API call can instead be used. The advantage of the HTTP loopback call is that it is supported by conventional web browsers so that no modification is needed to the browser to implement the third embodiment.

In step 1005, the pairing application appends the unique identifier that was received as part of step 1000a to the transaction data. The transaction data, including the appended unique identifier, is then transmitted to router 910. In the third embodiment step 1005 involves the pairing application generating an HTTP POST request and transmitting this request to router 910, where the payload of the POST request includes at least the transaction data including the appended unique identifier. The data protocol is however not essential to the working of the invention and any other data protocol known to the skilled person that is suitable for transmitting a payload to router 910 can alternatively be used. Equally, the pairing application could return the unique identifier to the web browser via an API call, which browser could then transmit the unique identifier to router 910.

Thereafter, system 900 operates in accordance with steps 1010 to 1030 and optionally 1035. These are the same as corresponding steps 110 to 135 of FIG. 1 and so, in the interests of conciseness, description of these steps is not repeated here.

It will be appreciated that the third embodiment can support arrangements in which one or both of payment initiating device 905 and payment instrument reading device 915 are mobile devices that are free to move around the premises in which they are located. Preferably, both devices are mobile devices. Advantageously, there does not need to be a one to one relationship between the payment initiating devices and payment instrument reading devices.

A skilled person having the benefit of the present disclosure will appreciate that all embodiments of the present invention enable automatic pairing of a payment initiating device with any one of a set of payment instrument reading devices. This advantageously provides a highly flexible electronic payment taking system that enables the use of COTS hardware, and in some cases thin-client COTS hardware, as payment initiating devices. Rekeying of information into a payment instrument reading device is not required at any point during the transaction process. Additionally, secure transactions such as full EMV transactions are supported, providing a high level of security.

Numerous modifications, adaptations and variations to the embodiments described herein will become apparent to a person skilled in the art having the benefit of the present disclosure, and such modifications, adaptations and variations that result in additional embodiments of the present invention are also within the scope of the accompanying claims.

The invention claimed is:

1. A router communicatively coupled to one or more payment initiating devices, one or more payment instrument reading devices, a mapping table, and a pairing module, wherein the router is configured to:
    receive transaction data from at least one payment initiating device;
    convert the transaction data into a suitable format for controlling the one or more payment instrument reading devices, wherein the converted transaction data includes instructions to the one or more payment instrument reading devices to initiate a payment taking process, and wherein the conversion of the transaction data is based on identity of the one or more payment instrument reading devices;
    receive a unique identifier with a mapping table update request for storage in the mapping table from the pairing module, wherein the pairing module communicate with at least one payment instrument reading device via a Radio-Frequency Identification-based (RFID) communication protocol to receive the unique identifier;
    update the mapping table to pair the at least one payment initiating device with the at least one payment instrument reading device, wherein the pairing module is configured to manage dynamic pairing between the at least one payment initiating device and the at least one payment instrument reading device; and
    transmit the converted transaction data to the at least one payment instrument reading device based on mapping information in the mapping table, wherein the mapping information includes the unique identifier to associate the at least one payment initiating device with the at least one payment instrument reading device.

2. The router of claim 1, wherein mappings between the one or more payment initiating devices and the one or more payment instrument reading devices in the mapping table is a static mapping that is constant for more than one transaction or a dynamic mapping that is transient and lasts for a duration of a particular transaction.

3. The router of claim 2, wherein the dynamic mapping is based on proximity information of the one or more payment initiating devices and the one or more payment instrument reading devices.

4. The router of claim 1, wherein the RFID communication protocol is a Near Field Communication (NFC) protocol.

5. The router of claim 1, wherein the router is communicatively coupled to one or more beacons, and wherein the router is further configured to:
    receive the transaction data including a unique beacon identifier from the one or more payment initiating devices, wherein the one or more payment initiating devices include locationing applications to identify at least one beacon, and wherein the at least one beacon is configured to broadcast a unique signal that is received by the one or more payment initiating devices.

6. The router of claim 5, wherein the one or more payment initiating devices are configured to identify the at least one beacon based on proximity of the one or more payment initiating devices to the at least one beacon.

7. The router of claim 1, wherein the router is configured to enter an automatic learning mode in response to a specific training signal from an operator by iteration of steps comprising:
    poll the at least one payment instrument reading device from the one or more payment instrument reading devices, wherein the polling includes determining the unique identifier associated with the at least one polled payment instrument reading device;
    identify, via the operator, the at least one polled payment instrument reading device and determine the at least one payment initiating device associated with the at least one polled payment instrument reading device;
    initiate, via the operator, a training request from the at least one payment initiating device, wherein the training request includes the unique identifier associated with the at least one payment initiating device; and
    store the unique identifier in the mapping table to associate the at least one payment initiating device with the at least one payment instrument reading device.

8. A computer-implemented method of processing transactions involving a payment instrument, comprising:
    receiving, at a router, transaction data from at least one payment initiating device;
    converting, via a conversion module, the transaction data into a suitable format for controlling one or more payment instrument reading devices, wherein the converted transaction data includes instructions to the one or more payment instrument reading devices to initiate a payment taking process, and wherein the conversion of the transaction data is based on identity of the one or more payment instrument reading devices;
    receiving, via the router, a unique identifier with a mapping table update request for storage in a mapping table from a pairing module, wherein the pairing module communicate with at least one payment instrument reading device via a Radio-Frequency Identification-based (RFID) communication protocol to receive the unique identifier;
    updating, via the router, the mapping table to pair the at least one payment initiating device with the at least one payment instrument reading device, wherein the pairing module is configured to manage dynamic pairing between the at least one payment initiating device and the at least one payment instrument reading device; and
    transmitting, via the router, the converted transaction data to the at least one payment instrument reading device based on mapping information in the mapping table, wherein the mapping information includes the unique identifier to associate the at least one payment initiating device with the at least one payment instrument reading device.

9. The computer-implemented method of claim 8, wherein mappings between one or more payment initiating devices and the one or more payment instrument reading devices in the mapping table is a static mapping that is constant for more than one transaction or a dynamic mapping that is transient and lasts for a duration of a particular transaction.

10. The computer-implemented method of claim 8, further comprising:
    receiving, via the router, the transaction data including a unique beacon identifier from one or more payment initiating devices, wherein the one or more payment initiating devices include locationing applications to identify at least one beacon, and wherein the at least one beacon is configured to broadcast a unique signal that is received by the one or more payment initiating devices.

11. The computer-implemented method of claim 10, wherein the one or more payment initiating devices are configured to identify the at least one beacon based on proximity of the one or more payment initiating devices to the at least one beacon.

12. The computer-implemented method of claim 8, wherein the router is configured to enter an automatic learning mode by iterating steps comprising:
   polling the at least one payment instrument reading device from the one or more payment instrument reading devices, wherein the polling includes determining the unique identifier associated with the at least one polled payment instrument reading device;
   identifying, via an operator, the at least one polled payment instrument reading device and determine the at least one payment initiating device associated with the at least one polled payment instrument reading device;
   initiating, via the operator, a training request from the at least one payment initiating device, wherein the training request includes the unique identifier associated with the at least one payment initiating device; and
   storing the unique identifier in the mapping table to associate the at least one payment initiating device with the at least one payment instrument reading device.

13. A system for processing transactions involving a payment instrument, comprising:
   a router communicatively coupled to one or more payment initiating devices, one or more payment instrument reading devices, a mapping table, and a pairing module, wherein the router is configured to:
      receive transaction data from at least one payment initiating device;
      convert the transaction data into a suitable format for controlling the one or more payment instrument reading devices, wherein the converted transaction data includes instructions to the one or more payment instrument reading devices to initiate a payment taking process, and wherein the conversion of the transaction data is based on identity of the one or more payment instrument reading devices;
      receive a unique identifier with a mapping table update request for storage in the mapping table from the pairing module, wherein the pairing module communicate with at least one payment instrument reading device via a Radio-Frequency Identification-based (RFID) communication protocol to receive the unique identifier;
      update the mapping table to pair the at least one payment initiating device with the at least one payment instrument reading device, wherein the pairing module is configured to manage dynamic pairing between the at least one payment initiating device and the at least one payment instrument reading device; and
      transmit the converted transaction data to the at least one payment instrument reading device based on mapping information in the mapping table, wherein the mapping information includes the unique identifier to associate the at least one payment initiating device with the at least one payment instrument reading device.

14. The system of claim 13, wherein mappings between the one or more payment initiating devices and the one or more payment instrument reading devices in the mapping table is a static mapping that is constant for more than one transaction or a dynamic mapping that is transient and lasts for a duration of a particular transaction.

15. The system of claim 13, wherein the router is communicatively coupled to one or more beacons, and wherein the router is further configured to:
   receive the transaction data including a unique beacon identifier from the one or more payment initiating devices, wherein the one or more payment initiating devices include locationing applications to identify at least one beacon, and wherein the at least one beacon is configured to broadcast a unique signal that is received by the one or more payment initiating devices.

* * * * *